United States Patent
Onodera et al.

(10) Patent No.: US 11,384,232 B2
(45) Date of Patent: Jul. 12, 2022

(54) HETEROPHASIC PROPYLENE POLYMERIZATION MATERIAL

(71) Applicant: SUMITOMO CHEMICAL COMPANY, LIMITED, Tokyo (JP)

(72) Inventors: Toru Onodera, Chiba (JP); Ryuji Ohhashi, Chiba (JP); Susumu Kanzaki, Chiba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 7 days.

(21) Appl. No.: 16/978,816

(22) PCT Filed: Mar. 12, 2019

(86) PCT No.: PCT/JP2019/009910
§ 371 (c)(1),
(2) Date: Sep. 8, 2020

(87) PCT Pub. No.: WO2019/176913
PCT Pub. Date: Sep. 19, 2019

(65) Prior Publication Data
US 2021/0047503 A1     Feb. 18, 2021

(30) Foreign Application Priority Data
Mar. 14, 2018    (JP) .............................. JP2018-046354

(51) Int. Cl.
*C08L 23/14*      (2006.01)
(52) U.S. Cl.
CPC ....... *C08L 23/142* (2013.01); *C08L 2205/025* (2013.01); *C08L 2205/03* (2013.01); *C08L 2207/02* (2013.01)

(58) Field of Classification Search
CPC .... C08L 23/08; C08L 23/0815; C08L 23/142; C08L 2205/025
See application file for complete search history.

(56) References Cited

U.S. PATENT DOCUMENTS

| | | | |
|---|---|---|---|
| 6,225,414 B1 | 5/2001 | Kume et al. | |
| 2006/0160941 A1 | 7/2006 | Kanzaki | |
| 2013/0137826 A1* | 5/2013 | Urakawa | ................. C08L 23/10 525/222 |

FOREIGN PATENT DOCUMENTS

| | | |
|---|---|---|
| EP | 1659151 | 5/2006 |
| EP | 2338656 | 6/2011 |
| EP | 2452975 | 5/2012 |
| EP | 2431416 | 10/2012 |
| JP | H09324022 | 12/1997 |
| JP | 2006193643 | 7/2006 |
| JP | 2008208306 | 9/2008 |
| JP | 2015025037 | 2/2015 |

* cited by examiner

*Primary Examiner* — Jeffrey C Mullis
(74) *Attorney, Agent, or Firm* — Meunier Carlin & Curfman LLC

(57) ABSTRACT

This heterophasic propylene polymerization material comprises a propylene copolymer (I), an ethylene-α-olefin copolymer (II-1), and an ethylene-α-olefin copolymer (II-2), wherein the contained amount of a monomeric unit derived from an olefin other than propylene in the propylene copolymer (I) is not less than 0.05 wt % but less than 10 wt %, the limiting viscosity $[\eta]_I$ of the propylene copolymer (I) is less than 1.50 dL/g, the contained amount of a monomeric unit derived from ethylene in the ethylene-α-olefin copolymer (II-2) is 10-30 wt %, and the limiting viscosity of the ethylene-α-olefin copolymer (II-2) is higher than that of the ethylene-α-olefin copolymer (II-1).

8 Claims, No Drawings

HETEROPHASIC PROPYLENE POLYMERIZATION MATERIAL

CROSS-REFERENCE TO RELATED APPLICATIONS

This application is a United States National Phase Patent Application of International Patent Application Number PCT/JP2019/009910, filed on Mar. 12, 2019, which claims priority to JP Patent Application No. 2018-046354, filed on Mar. 14, 2018, both of which are incorporated by reference herein in their entireties.

TECHNICAL FIELD

The present invention relates to a heterophasic propylene polymerization material.

BACKGROUND ART

Heterophasic propylene polymerization materials are widely used in various fields such as automobile parts, home appliances, food and medical containers, and building and civil engineering materials due to their advantageous properties. For example, Patent Document 1 discloses a heterophasic propylene polymerization material including a propylene homopolymer part and a propylene-ethylene random copolymer part.

PRIOR ART DOCUMENT

Patent Document

Patent Document 1: JP-A-2008-208306

SUMMARY OF THE INVENTION

Problems to be Solved by the Invention

Recently, in the fields mentioned above, resin molded articles with various designs are used, and therefore, there is a demand for a material with which such various designs can be expressed. For example, there is a demand for a heterophasic propylene polymerization material from which a molded article that can exhibit more black appearance can be obtained when the molded article is fabricated as a black molded article with an emboss-designed surface.

An object of the present invention is to provide a heterophasic propylene polymerization material from which a molded article that can exhibit more black appearance can be obtained when the molded article is fabricated as a black molded article with an emboss-designed surface.

Means for Solving the Problems

The present invention provides the following polymerization material.

[1] A heterophasic propylene polymerization material, including: a propylene copolymer (I); an ethylene-α-olefin copolymer (II-1); and an ethylene-α-olefin copolymer (II-2), in which a limiting viscosity $[\eta]_I$ of the propylene copolymer (I) is less than 1.50 dL/g.

The propylene copolymer (I): a copolymer that includes a monomer unit derived from propylene and a monomer unit derived from at least one kind of olefin selected from the group consisting of ethylene and $C_4$ to $C_{12}$ α-olefins, in which a content of the monomer unit derived from at least one kind of olefin selected from the group consisting of ethylene and $C_4$ to $C_{12}$ α-olefins is not less than 0.05 wt % but less than 10 wt %, with respect to 100 wt % of a total weight of the propylene copolymer (I).

The ethylene-α-olefin copolymer (II-1): a copolymer that includes a monomer unit derived from ethylene, and a monomer unit derived from at least one kind of olefin selected from the group consisting of propylene and $C_4$ to $C_{12}$ α-olefins, in which a content of the monomer unit derived from ethylene is not less than 10 wt % but not more than 30 wt % with respect to 100 wt % of a total weight of the ethylene-α-olefin copolymer (II-1).

The ethylene-α-olefin copolymer (II-2): a copolymer that includes a monomer unit derived from ethylene, and a monomer unit derived from at least one kind of olefin selected from the group consisting of propylene and $C_4$ to $C_{12}$ α-olefins, in which a content of the monomer unit derived from ethylene is not less than 10 wt % but not more than 30 wt % with respect to 100 wt % of a total weight of the ethylene-α-olefin copolymer (II-2), and in which the ethylene-α-olefin copolymer (II-2) has a greater limiting viscosity than limiting viscosity of the ethylene-α-olefin copolymer (II-1).

[2] The heterophasic propylene polymerization material according to [1], in which a ratio $[\eta]_{CXS}/[\eta]_{CXIS}$ is 1.0 or greater, where $[\eta]_{CXS}$ is a limiting viscosity of a xylene soluble component of the heterophasic propylene polymerization material and $[\eta]_{CXIS}$ is a limiting viscosity of a xylene insoluble component of the heterophasic propylene polymerization material.

[3] The heterophasic propylene polymerization material according to [1] or [2], in which following Equation (3) is satisfied, $$X=(a_1 b_1 + a_2 b_2)/(a_1 + a_2) \quad (1),$$

$$Y=a_1+a_2 \quad (2), \text{ and}$$

$$Y \leq 4.37X - 32.4 \quad (3),$$

where $a_1$ is the content (wt %) of the ethylene-α-olefin copolymer (II-1), and $a_2$ is the content (wt %) of the ethylene-α-olefin copolymer (II-2) (where the total weight of the heterophasic propylene polymerization material is 100 wt %), $b_1$ is the content (wt %) of the monomer unit derived from ethylene in the ethylene-α-olefin copolymer (II-1) (where the total weight of the ethylene-α-olefin copolymer (II-1) is 100 wt %), and $b_2$ is the content (wt %) of the monomer unit derived from ethylene in the ethylene-α-olefin copolymer (II-2) (where the total weight of the ethylene-α-olefin copolymer (II-2) is 100 wt %).

[4] A propylene resin composition including the heterophasic propylene polymerization material according to any one of [1] to [3], and a thermoplastic elastomer (III).

[5] The propylene resin composition according to [4], further including a filler (D).

[6] A propylene resin composition including the heterophasic propylene polymerization material according to any one of [1] to [3], and a filler (D).

[7] A molded article, including the heterophasic propylene polymerization material according to any one of [1] to [3].

[8] A molded article, including the propylene resin composition according to any one of [4] to [6].

Effect of the Invention

According to the present invention, it is possible to provide a heterophasic propylene polymerization material from which a molded article that can exhibit more black appearance can be obtained when the molded article is fabricated as a black molded article with an emboss-designed surface.

MODE FOR CARRYING OUT THE INVENTION

<Configuration of Heterophasic Propylene Polymerization Material>

A heterophasic propylene polymerization material according to the present invention is a propylene polymerization material including a propylene copolymer (I), an ethylene-α-olefin copolymer (II-1), and an ethylene-α-olefin copolymer (II-2).

The propylene copolymer (I) is a copolymer including a monomer unit derived from propylene and a monomer unit derived from at least one kind of olefin selected from the group consisting of ethylene and $C_4$ to $C_{12}$ α-olefins, in such a way that a content of the monomer unit derived from at least one kind of olefin selected from the group consisting of ethylene and $C_4$ to $C_{12}$ α-olefins is not less than 0.05 wt % but less than 10 wt %, with respect to 100 wt % of a total weight of the propylene copolymer (I). It is preferable that the content of the monomer unit derived from the at least one kind of olefin be not less than 4 wt % but not more than 7 wt %.

A limiting viscosity $[\eta]_I$ of the propylene copolymer (I) is less than 1.50 dL/g. For the sake of fluidability, the limiting viscosity $[\eta]_I$ of the propylene copolymer (I) may be preferably 1.0 dL/g or less, or more preferably 0.95 dL/g or less. $[\eta]_I$ may be preferably 0.7 dL/g or more, or more preferably 0.8 or more.

The limiting viscosity $[\eta]_I$ of the propylene copolymer (I) can be adjusted by adjusting hydrogen concentration in producing the propylene copolymer (I), for example. With a greater hydrogen concentration in producing the propylene copolymer (I), $[\eta]_I$ can be smaller.

In this Description, the limiting viscosity is a limiting viscosity measured at 135° C. in tetralin, and worked out according to the calculation method described on item 491 of "Kobunshi Yoeki, Kobunshi Jicckengaku 11" (Polymer solutions, polymer experiments 11) (published in 1982 from KYORITSU SHUPPAN CO., LTD), that is, the limiting viscosity is a viscosity worked out by extrapolation based on plotting of reduction viscosity against concentration and extrapolating to zero concentration. The reduction viscosity is measured at 135° C. by using a tetralin solvent by using an Ubbelohde-type viscometer at three points of concentrations of 0.1 g/dL, 0.2 g/dL, and 0.5 g/dL.

Examples of the propylene copolymer (I) include:

(1) a propylene-ethylene copolymer in which a content of a monomer unit derived from propylene is more than 90 wt % but not more than 99.95 wt %, and a content of a monomer unit derived from ethylene is not less than 0.05 wt % but less than 10 wt % (where a total amount of the propylene-ethylene copolymer is 100 wt %);

(2) a propylene-ethylene-α-olefin copolymer in which a content of a monomer unit derived from propylene is more than 90 wt % but not more than 99.95 wt %, a content of a monomer unit derived from ethylene is not less than 0.05 wt % but less than 10 wt %, and a content of a monomer unit derived from an olefin derived from $C_4$ to $C_{12}$ α-olefins is more than 0 wt % but less than 10 wt % (where a total amount of the propylene-ethylene-α-olefin copolymer is 100 wt %); and (3) A propylene-α-olefin copolymer in which a content of a monomer unit derived from propylene is more than 90 wt % but not more than 99.95 wt %, and a content of a monomer unit derived from an olefin derived from $C_4$ to $C_{12}$ α-olefins is not less than 0.05 wt % but less than 10 wt % (where a total amount of the propylene-α-olefin copolymer is 100 wt %).

The ethylene-α-olefin copolymer (II-1) is a copolymer including a monomer unit derived from ethylene, and a monomer unit derived from at least one kind of olefin selected from the group consisting of propylene and $C_4$ to $C_{12}$ α-olefins, in such a way that a content of the monomer unit derived from ethylene is not less than 10 wt % but not more than 30 wt % with respect to 100 wt % of a total weight of the ethylene-α-olefin copolymer (II-1). The content of the monomer unit derived from ethylene may be preferably not less than 15 wt % but not more than 25 wt %, or more preferably not less than 18 wt % but not more than 25 wt %.

The ethylene-α-olefin copolymer (II-2) is a copolymer including a monomer unit derived from ethylene, and a monomer unit derived from at least one kind of olefin selected from the group consisting of propylene and $C_4$ to $C_{12}$ α-olefins, in such a way that a content of the monomer unit derived from ethylene is not less than 10 wt % but not more than 30 wt % with respect to 100 wt % of a total weight of the ethylene-α-olefin copolymer (II-2), and has a greater limiting viscosity than limiting viscosity of the ethylene-α-olefin copolymer (II-1). The content of the monomer unit derived from ethylene may be preferably not less than 15 wt % but not more than 25 wt %, or more preferably not less than 18 wt % but not more than 25 wt %.

The monomer unit derived from at least one kind of olefin selected from the group consisting of $C_4$ to $C_{12}$ α-olefins, which is included in the propylene copolymer (I), the ethylene-α-olefin copolymer (II-1), and the ethylene-α-olefin copolymer (II-2), is derived from a $C_4$ to $C_{12}$ α-olefin, whose concrete examples include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyle-1-hexene, and 2,2,4-trimethyl-1-pentene, and the like, and which may be preferably 1-butene, 1-hexene, or 1-octene, or more preferably 1-butene.

The propylene copolymer (I) may be a random copolymer in exemplary embodiments. Moreover, the ethylene-α-olefin copolymer (II-1) and the ethylene-α-olefin copolymer (II-2) may be random copolymers in exemplary embodiments.

Examples of the propylene copolymer (I) include a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, and a propylene-ethylene-1-decene copolymer. It is preferable the propylene copolymer (I) be the propylene-ethylene copolymer, the propylene-1-butene copolymer, and the propylene-ethylene-1-butene copolymer.

Examples of the ethylene-α-olefin copolymer (II-1) and the ethylene-α-olefin copolymer (II-2) include an ethylene-propylene copolymer, an ethylene-propylene-1-butene copolymer, an ethylene-propylene-1-hexene copolymer, an ethylene-propylene-1-octene copolymer, an ethylene-1-butene copolymer, an ethylene-1-hexene copolymer, an ethylene-1-octene copolymer, and the like. It is preferable the ethylene-α-olefin copolymer (II-1) and the ethylene-α- olefin copolymer (II-2) be the ethylene-propylene copolymer, the ethylene-1-butene copolymer, or the ethylene-1-octene copolymer, and it is more preferable that the ethylene-α-olefin copolymer (II-1) and the ethylene-α-olefin copolymer (II-2) be the ethylene-propylene copolymer.

In this Description, a concrete example of the heterophasic propylene polymerization material is referred to as "(propylene copolymer (I))-(ethylene-α-olefin copolymer) heterophasic polymerization material". For example, what is meant by a wording "(ethylene-propylene)-(ethylene-propylene) heterophasic polymerization material" is a heterophasic propylene polymerization material in which the propylene copolymer (I) is the ethylene-propylene copolymer and the ethylene-α-olefin copolymer (II-1) and the ethylene-α-olefin copolymer (II-2) are the ethylene-propylene copolymer.

In the case where the propylene copolymer (I) of the heterophasic propylene polymerization material is the ethylene-propylene copolymer, examples of the polymerization material include an (ethylene-propylene)-(ethylene-propylene) heterophasic polymerization material, an (ethylene-propylene)-(ethylene-propylene-1-butene) heterophasic polymerization material, an (ethylene-propylene)-(ethylene-propylene-1-octene) heterophasic polymerization material, an (ethylene-propylene)-(ethylene-1-butene) heterophasic polymerization material, and an (ethylene-propylene)-(ethylene-1-octene) heterophasic polymerization material.

Preferable example of the heterophasic propylene polymerization material is an (ethylene-propylene)-(ethylene-propylene) heterophasic polymerization material, an (ethylene-propylene)-(ethylene-propylene-1-butene) heterophasic polymerization material, an (ethylene-propylene)-(ethylene-1-butene) heterophasic polymerization material, or an (ethylene-propylene)-(ethylene-1-octene) heterophasic polymerization material.

In this Description, a "xylene insoluble component" in the heterophasic propylene polymerization material is a component that is contained in the heterophasic propylene polymerization material but is insoluble in p-xylene, and that is a solid material obtained by a method described below.

Into 2000 mL of boiled p-xylene, 2 g of the heterophasic propylene polymerization material is completely dissolved thereby to obtain a solution, and then the solution is cooled to 25° C. and left to stand, thereby precipitating the solid material in the solution of 25° C.

In this Description, a "xylene soluble component" in the heterophasic propylene polymerization material is a component that is contained in the heterophasic propylene polymerization material other than the xylene insoluble component.

The heterophasic propylene polymerization material according to the present invention may be preferably configured such that a ratio $[\eta]_{CXS}/[\eta]_{CXIS}$ is 1.0 or greater, where $[\eta]_{CXS}$ is a limiting viscosity of the xylene soluble component of the heterophasic propylene polymerization material and $[\eta]_{CXIS}$ is a limiting viscosity of the xylene insoluble component thereof. $[\eta]_{CXS}/[\eta]_{CXS}$ may be more preferably 1.1 or greater, further preferably 1.2 or greater, or still further preferably 1.3 or greater.

$[\eta]_{CXS}/[\eta]_{CXS}$ can be adjusted, for example, by adjusting the hydrogen concentration in producing the propylene copolymer (I), the ethylene-α-olefin copolymer (II-1), and the ethylene-α-olefin copolymer (II-2). With a greater hydrogen concentration in producing these copolymers, the limiting viscosities of the copolymers can be smaller, whereas with a lower hydrogen concentration, the limiting viscosities of the copolymers can be greater. One example of a method for attaining $[\eta]_{CXS}/[\eta]_{CXS}$ of 1.0 or more is configuring such that the limiting viscosity of the propylene copolymer (I) is smaller than at least one of the limiting viscosities of the ethylene-α-olefin copolymer (II-1) and the ethylene-α-olefin copolymer (II-2), and a preferable example of the method is configuring such that the limiting viscosity of the propylene copolymer (I) is smaller than the limiting viscosities of the ethylene-α-olefin copolymer (II-1) and the ethylene-α-olefin copolymer (II-2). Thus, the hydrogen concentrations in producing these copolymers are adjusted to give such limiting viscosities to these copolymers.

The heterophasic propylene polymerization material according to the present invention, in which the following Equation (3) is preferably satisfied, $$X=(a_1 b_1+a_2 b_2)/(a_1+a_2) \tag{1},$$

$$Y=a_1+a_2 \tag{2, and}$$

$$Y \leq 4.37X-32.4 \tag{3},$$

where $a_1$ is the content (wt %) of the ethylene-α-olefin copolymer (II-1), and $a_2$ is the content (wt %) of the ethylene-α-olefin copolymer (II-2) (where the total weight of the heterophasic propylene polymerization material is 100 wt %), b1 is the content (wt %) of the monomer unit derived from ethylene in the ethylene-α-olefin copolymer (II-1) (where the total weight of the ethylene-α-olefin copolymer (II-1) is 100 wt %), and b2 is the content (wt %) of the monomer unit derived from ethylene in the ethylene-α-olefin copolymer (II-2) (where the total weight of the ethylene-α-olefin copolymer (II-2) is 100 wt %).

Equation (3) can be adjusted for example, by adjusting polymerization temperature, polymerization pressure, and residence time in producing the ethylene-α-olefin copolymer (II-1) and the ethylene-α-olefin copolymer (II-2). With a higher polymerization temperature, the content of the copolymer(s) produced in the reactor can be increased. With a higher polymerization pressure, the content of the monomer unit derived from ethylene in the copolymer(s) produced in the reactor can be increased. With a longer residence time, the content of the copolymer(s) produced in the reactor can be increased.

Preferably, X may be not less than 17 but not more than 23. Y may be preferably not less than 30 but not more than 50, more preferably not less than 40 but not more than 50, or further preferably not less than 42 but not more than 50.

The total content of the ethylene-α-olefin copolymer (II-1) and the ethylene-α-olefin copolymer (II-2) contained in the heterophasic propylene polymerization material is preferably not less than 20 wt % but not more than 70 wt %, more preferably not less than 30 wt % but not more than 60 wt %, or further preferably not less than 30 wt % but not more than 50 wt % (where the total weight of the heterophasic propylene polymerization material is 100 wt %). The content of the ethylene-α-olefin copolymer (II-2) contained in the heterophasic propylene polymerization material is preferably not less than 5 wt % but not more than 15 wt % (where the total weight of the heterophasic propylene polymerization material is 100 wt %).

The limiting viscosity of the ethylene-α-olefin copolymer (II-1) measured in tetralin at 135° C. may be preferably not less than 0.1 dL/g but not more than 5 dL/g, more preferably not less than 1.0 dL/g but not more than 5.0 dL/g, or further preferably not less than 1.5 dL/g but not more than 4.0 dL/g.

The limiting viscosity of the ethylene-α-olefin copolymer (II-2) measured in tetralin at 135° C. may be preferably not less than 5.0 dL/g but not more than 10 dL/g, more preferably not less than 5.0 dL/g but not more than 9.0 dL/g, or further preferably not less than 5.0 dL/g but not more than 8.0 dL/g. The limiting viscosity of the ethylene-α-olefin copolymer (II-2) is greater than the limiting viscosity of the ethylene-α-olefin copolymer (II-1), and a difference between the limiting viscosity of the ethylene-α-olefin copolymer (II-2) and the limiting viscosity of the ethylene-α-olefin copolymer (II-1) may be preferably in a range of 4 dL/g to 8 dL/g.

The limiting viscosity $[\eta]_{CXS}$ of the xylene soluble component of the heterophasic propylene polymerization material may be preferably not less than 0.1 dL/g but not more than 10 dL/g, more preferably not less than 1.0 dL/g but not more than 5.0 dL/g, or further preferably not less than 1.5 dL/g but not more than 4.0 dL/g.

A molecular weight distribution (Mw/Mn) of the xylene soluble component of the heterophasic propylene polymerization material may be preferably 4.0 or greater, more preferably 5.0 or greater, further preferably 6.0 or greater, or still further preferably 7.0 or greater. The molecular weight distribution (Mw/Mn) of the xylene soluble component of the heterophasic propylene polymerization material may be preferably not more than 50.

The content of the monomer unit derived from ethylene in the heterophasic propylene polymerization material may be preferably not less than 8 wt % but not more than 30 wt %, more preferably not less than 9 wt % but not more than 25 wt %, or further preferably not less than 10 wt % but not more than 20 wt % (where the total weight of the heterophasic propylene polymerization material is 100 wt %).

Melt flow rates of the heterophasic propylene polymerization material and the composition thereof may be preferably not less than 1 g/10 min but not more than 100 g/10 min, more preferably not less than 2 g/10 min but not more than 80 g/10 min, or further preferably not less than 3 g/10 min but not more than 60 g/10 min. The melt flow rates are measured at 230° C. with a load of 2.16 kg according to the method stipulated under JIS K6758.

In one exemplary embodiment, the heterophasic propylene polymerization material and the composition thereof according to the present invention are such that an Izod impact strength measured according to a method described in Examples below is preferably 3.0 kJ/m² or more, more preferably 3.5 kJ/m² or more, or further preferably 4.0 kJ/m² or more. With a greater Izod impact strength, the heterophasic propylene polymerization material and the composition thereof according to the present invention become excellent in low-temperature impact property.

<Production Method of Heterophasic Propylene Polymerization Material>

The propylene copolymer (I), the ethylene-α-olefin copolymer (II-1), and the ethylene-α-olefin copolymer (II-2) may be produced by sequential polymerization in a reactor thereby to obtain the heterophasic propylene polymerization material. As an alternative, the propylene copolymer (I), the ethylene-α-olefin copolymer (II-1), and the ethylene-α-olefin copolymer (II-2) may be sequentially produced in multi-stage reactors connected in tandem, thereby to obtain the heterophasic propylene polymerization material. As an alternative, the propylene copolymer (I), the ethylene-α-olefin copolymer (II-1), and the ethylene-α-olefin copolymer (II-2) may be produced in separate reactors, and blended together. Examples of a method of blending include blending solutions of these copolymers, blending these copolymers melted, and the like blending.

It is preferable that the propylene copolymer (I), the ethylene-α-olefin copolymer (II-1), and the ethylene-α-olefin copolymer (II-2) be sequentially produced in multi-stage reactors connected in tandem (multi-stage polymerization). The number of the multi-stage reactors are not particularly limited, but for example the multi-stage reactors may include 6 stages for the polymerization of the propylene copolymer (I), and 2 stages for the polymerization of the ethylene-α-olefin copolymer (II-1) and the ethylene-α-olefin copolymer (II-2). The polymerization of the propylene copolymer (I) may be before or after the polymerization of the ethylene-α-olefin copolymer (II-1) and the ethylene-α-olefin copolymer (II-2). The heterophasic propylene polymerization material obtained by the multi-stage polymerization has greater dispersion in which the propylene copolymer (I), the ethylene-α-olefin copolymer (II-1), and the ethylene-α-olefin copolymer (II-2) are dispersed with a greater homogenization, compared with one obtained by blending together the components produced in separate reactors, so that the heterophasic propylene polymerization material obtained by the multi-stage polymerization has such characteristics that the heterophasic propylene polymerization material has greater properties such as low-temperature impact property.

Examples of the production method of the heterophasic propylene polymerization material according to the present invention include the followings:

<Production Method 1>

A production method of the heterophasic propylene polymerization material including Step (1-1) and Step (1-2) as described below.

Step (1-1): performing a multi-stage polymerization method in the presence of a propylene polymerization catalyst so as to copolymerize propylene and at least one kind of olefin selected from the group consisting of ethylene and $C_4$ to $C_{12}$ α-olefins, thereby obtaining the propylene copolymer (I).

Step (1-2): performing a multi-stage polymerization method in the presence of the propylene copolymer (I) so as to copolymerize ethylene and at least one kind of olefin selected from the group consisting of propylene and $C_4$ to $C_{12}$ α-olefins, thereby obtaining the heterophasic propylene polymerization material including the propylene copolymer (I), the ethylene-α-olefin copolymer (II-1), and the ethylene-α-olefin copolymer (II-2).

<Production Method 2>

A production method of the heterophasic propylene polymerization material including Step (2-1) and Step (2-2) as described below.

Step (2-1): performing a multi-stage polymerization method in the presence of a propylene polymerization catalyst so as to copolymerize ethylene and at least one kind of olefin selected from the group consisting of propylene and $C_4$ to $C_{12}$ α-olefins, thereby obtaining the ethylene-α-olefin copolymer (II-1) and the ethylene-α-olefin copolymer (II-2).

Step (2-2): performing a multi-stage polymerization method in the presence of the ethylene-α-olefin copolymer (II-1) and the ethylene-α-olefin copolymer (II-2) so as to copolymerize propylene and at least one kind of olefin selected from the group consisting of ethylene and $C_4$ to $C_{12}$ α-olefins, thereby obtaining the heterophasic propylene polymerization material including the propylene copolymer (I), the ethylene-α-olefin copolymer (II-1), and the ethylene-α-olefin copolymer (II-2).

<Production Method 1-1>

A production method of the heterophasic propylene polymerization material including Step (1-1), Step (1-2-1), and Step (1-2-2) as described below.

Step (1-1): performing a multi-stage polymerization method in the presence of a propylene polymerization catalyst so as to copolymerize propylene and at least one kind of olefin selected from the group consisting of ethylene and $C_4$ to $C_{12}$ α-olefins, thereby obtaining the propylene copolymer (I).

Step (1-2-1): copolymerizing, in the presence of the propylene copolymer (I), ethylene and at least one kind of olefin selected from the group consisting of propylene and $C_4$ to $C_{12}$ α-olefins, so as to obtain a mixture of the propylene copolymer (I) and the ethylene-α-olefin copolymer (II-1).

Step (1-2-2): copolymerizing, in the presence of the mixture, ethylene and at least one kind of olefin selected from the group consisting of propylene and $C_4$ to $C_{12}$ α-olefins, so as to obtain the heterophasic propylene polymerization material including the propylene copolymer (I), the ethylene-α-olefin copolymer (II-1), and the ethylene-α-olefin copolymer (II-2).

<Production Method 1-2>

A production method of the heterophasic propylene polymerization material including Step (1-1), Step (1-2-3), and Step (1-2-4) as described below.

Step (1-1): performing a multi-stage polymerization method in the presence of a propylene polymerization catalyst so as to copolymerize propylene and at least one kind of olefin selected from the group consisting of ethylene and $C_4$ to $C_{12}$ α-olefins, thereby obtaining the propylene copolymer (I).

Step (1-2-3): copolymerizing, in the presence of the propylene copolymer (I), ethylene and at least one kind of olefin selected from the group consisting of propylene and $C_4$ to $C_{12}$ α-olefins, so as to obtain a mixture of the propylene copolymer (I) and the ethylene-α-olefin copolymer (II-2);

Step (1-2-4): copolymerizing, in the presence of the mixture, ethylene and at least one kind of olefin selected from the group consisting of propylene and $C_4$ to $C_{12}$ α-olefins, so as to obtain the heterophasic propylene polymerization material including the propylene copolymer (I), the ethylene-α-olefin copolymer (II-1), and the ethylene-α-olefin copolymer (II-2).

Production method 2 is, more specifically, the following production method 2-1 or the production method 2-2.

<Production Method 2-1>

A production method of the heterophasic propylene polymerization material including a step (2-1-1), a step (2-1-2) and a step (2-2) as described below.

Step (2-1-1): performing copolymerization in the presence of a propylene polymerization catalyst so as to copolymerize ethylene, and at least one kind of olefin selected from the group consisting of propylene and $C_4$ to $C_{12}$ α-olefins, thereby obtaining the ethylene-α-olefin copolymer (II-1).

Step (2-1-2): performing copolymerization in the presence of the ethylene-α-olefin copolymer (II-1) so as to copolymerize ethylene and at least one kind of olefin selected from the group consisting of propylene and $C_4$ to $C_{12}$ α-olefins, thereby obtaining a mixture of the ethylene-α-olefin copolymer (II-1) and the ethylene-α-olefin copolymer (II-2).

Step (2-2): performing a multi-stage polymerization method in the presence of the mixture so as to copolymerize propylene and at least one kind of olefin selected from the group consisting of ethylene and $C_4$ to $C_{12}$ α-olefins, thereby obtaining the heterophasic propylene polymerization material including the propylene copolymer (I), the ethylene-α-olefin copolymer (II-1), and the ethylene-α-olefin copolymer (II-2).

<Production Method 2-2>

A production method of the heterophasic propylene polymerization material including Step (2-1-3), Step (2-1-4) and Step (2-2) as described below.

Step (2-1-3): performing copolymerization in the presence of a propylene polymerization catalyst so as to copolymerize ethylene, and at least one kind of olefin selected from the group consisting of propylene and $C_4$ to $C_{12}$ α-olefins, thereby obtaining the ethylene-α-olefin copolymer (II-2).

Step (2-1-4): performing copolymerization in the presence of the ethylene-α-olefin copolymer (II-2) so as to copolymerize ethylene and at least one kind of olefin selected from the group consisting of propylene and $C_4$ to $C_{12}$ α-olefins, thereby obtaining a mixture of the ethylene-α-olefin copolymer (II-1) and the ethylene-α-olefin copolymer (II-2).

Step (2-2): performing a multi-stage polymerization method in the presence of the mixture so as to copolymerize propylene and at least one kind of olefin selected from the group consisting of ethylene and $C_4$ to $C_{12}$ α-olefins, thereby obtaining the heterophasic propylene polymerization material including the propylene copolymer (I), the ethylene-α-olefin copolymer (II-1), and the ethylene-α-olefin copolymer (II-2).

Step (1-2-1), Step (1-2-2), Step (1-2-3), Step (1-2-4), Step (2-1-1), Step (2-1-2), Step (2-1-3), and Step (2-1-4) may independently be multi-stage polymerization or single-stage polymerization.

The multi-staged polymerization is a polymerization method in which monomers are polymerized in a presence of a polymerization catalyst through a plurality of reaction regions cascaded in series, and which includes the following steps a to c:

Step a: for supplying a polymerization catalyst and a monomer(s) in a first reaction region uppermost in the cascade, and polymerizing the monomer(s), thereby obtaining a polymer;

Step b: for transferring the polymer obtained in the first reaction region to a second reaction region connected to the first reaction region; and Step c: for supplying a monomer(s) to the second reaction region, and polymerizing the monomer(s) in the presence of the polymer obtained in the first reaction region, thereby obtaining a polymer.

In the case where there are 3 or more reaction regions cascaded in series, steps corresponding to Step b and Step c are carried out for a third reaction region or for third and later reaction regions.

Examples of how to carry out the multi-staged polymerization include:

a case where the multi-staged polymerization is carried out in a system where a plurality of reactions vessels are cascaded in series, each reactor having one reaction region;

a case where the multi-staged polymerization is carried out in a reactor having a plurality of reaction regions;

a case where the multi-staged polymerization is carried out in a system where a reactor having one reaction region, and a reactor having a plurality of reaction regions are connected.

Examples of the reactor having a plurality of reaction regions in a reactor include multi-staged spouted-bed reactors.

The number of reaction regions in the multi-stage polymerization method is not particularly limited. For Step (1-1) or Step (2-2), it is preferable that the multi-staged polymerization has 6 to 10 reaction regions. For Step (1-2) or Step (2-1), it is preferable that the multi-staged polymerization has 2 to 5 reaction regions.

The production method of the heterophasic propylene polymerization material according to the present invention may include a step of polymerizing, in the presence of a solid catalyst component and an organic aluminum compound, a small amount of an olefin(s) (which is at least one of the olefin(s) used in the above-mentioned copolymerization (in general, referred to as a main polymerization) so as to generate an olefin polymer (in the polymerization herein, a chain-transfer agent such as hydrogen, or an external electron donor may be used for adjusting a molecular weight of the olefin polymer thus produced) and producing a catalyst component being covered with the olefin polymer on its surface (the polymerization herein is, in general, referred to as prepolymerization, and therefore, the catalyst component is referred to as a prepolymerization catalyst component, in general).

In the production method of the heterophasic propylene polymerization material according to the present invention, propylene polymerization catalysts listed below are preferably usable.

In one exemplary embodiment, a propylene polymerization catalyst obtainable by contacting a solid catalyst component with an organic aluminum compound, for example by a known method may be used. Moreover, in another exemplary embodiment, a propylene polymerization catalyst obtainable by contacting a solid catalyst component with an organic aluminum compound and an external electron donor may be used.

As the solid catalyst component, solid catalyst components as described below are preferably usable:

Olefin polymerization solid catalyst components containing at least one internal electron donor selected from the group consisting of monoester compounds, aliphatic dicarboxylic ester compounds, diol diester compounds, β-alkoxyether compounds, and diether compounds, and a titanium atom, a magnesium atom, and a halogen atom, and satisfying the features (I) to (IV).

(I) having a total pore volume in a range of 0.95 to 1.80 mL/g, where the total pore volume is measured by the mercury press-in method under Standard ISO 15901-1:2005, and a specific surface area in a range of 60 to 170 m$^2$/g, where the specific surface area is measured by the mercury press-in method under Standard ISO 15901-1:2005;

(II) having such a particle size distribution that cumulative percentage of particles of 10 μm or less is 6.5% or less, where the particle size distribution is on the basis of volume measurement by the laser diffraction and scattering method under Standard ISO 13320:2009;

(III) having a ratio G/F of 0.33 or less, where F is an area of peaks of binding energy having a peak top in a range of 532 eV (inclusive) to 534 eV (inclusive), and G is an area of peaks of binding energy having a peak top in a range of 529 eV (inclusive) to 532 eV (not inclusive), where peaks are obtained by waveform separation of peaks of the 1s orbit of oxygen atoms observed in X-ray photoelectron spectroscopy under Standard ISO 15472:2001; and (IV) having titanium content in a range of 1.50 to 3.40 wt %.

Such a solid catalyst component may be produced, for example, by a production method of a solid catalyst component including a step (I) of preparing a slurry by contacting a titanium halide compound solution including a titanium halide compound and a solvent with a magnesium compound thereby to prepare the slurry including a solid product thus obtained, the step (I) being such that a ratio (A/C) is 3 or less, where A is represented by Equation (1) below and C is represented by Equation (2) below:

$$A=a/b \quad (1),$$

where a is a volume (mL) of the titanium halide compound contained in the titanium halide compound solution, and b is a volume (mL) of the solvent contained in the titanium halide compound solution, and $$C=a/c \quad (2),$$

where a is a volume (mL) of the titanium halide compound contained in the titanium halide compound solution, and c is a volume (mL) of the solvent contained in the slurry including the solid product.

As the monoester compounds used as the internal electron donor, aromatic carboxylic ester compounds and aliphatic carboxylic ester compounds are preferable. Examples of such aromatic carboxylic ester compounds include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, octyl toluate, and the like. Examples of the aliphatic carboxylic ester compounds include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

Examples of the aliphatic dicarboxylic ester compounds include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enediate, diethyl (E)-but-2-enediate, dipropyl (E)-but-2-enediate, dibutyl (E)-but-2-enediate, dipentyl (E)-but-2-enediate, dihexyl (E)-but-2-enediate, dioctyl (E)-but-2-enediate, dimethyl (Z)-but-2-enediate, diethyl (Z)-but-2-enediate, dipropyl (Z)-but-2-enediate, dibutyl (Z)-but-2-enediate, dipentyl (Z)-but-2-enediate, dihexyl (Z)-but-2-enediate, dioctyl (Z)-but-2-enediate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methyl cyclohexane-1,2-dicarboxylate, diethyl 3-methyl cyclohexane-1,2-dicarboxylate, dipropyl 3-methyl cyclohexane-1,2-dicarboxylate, dibutyl 3-methyl cyclohexane-1,2-dicarboxylate, dipentyl 3-methyl cyclohexane-1,2-dicarboxylate, dihexyl 3-methyl cyclohexane-1,2-dicarboxylate, dioctyl 3-methyl cyclohexane-1,2-dicarboxylate, dimethyl 3,6-dimethyl cyclohexane-1,2-dicarboxylate, diethyl 3,6-dimethyl cyclohexane-1,2-dicarboxylate, dipropyl 3,6-dimethyl cyclohexane-1,2-dicarboxylate, dibutyl 3,6-dimethyl cyclohexane-1,2-dicarboxylate, dipentyl 3,6-dimethyl cyclohexane-1,2-dicarboxylate, dihexyl 3,6-dimethyl cyclohexane-1,2-dicarboxylate, and dioctyl 3,6-dimethyl cyclohexane-1,2-dicarboxylate.

Examples of the diol diester compounds include 1,2-dibenzoate propane, 1,2-diacetyloxypropane, 1,2-dibenzoate butane, 1,2-diacetyloxybutane, 1,2-dibenzoate cyclohexane, 1,2-diacetyloxy-cyclohexane, 1,3-dibenzoate propane, 1,3-diacetyloxy propane, 2,4-dibenzoate pentane, 2,4-acetyloxy pentane, 1,2-dibenzoate cyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate-4-tert-butyl-6-methylbenzene, and 1,3-diacetyloxy-4-tert-butyl-6-methylbenzene.

Examples of the β-alkoxyester compounds include methyl 2-methoxymethyl-3,3-dimethyl butanoate, ethyl 2-methoxymethyl-3,3-dimethyl butanoate, propyl 2-methoxymethyl-3,3-dimethyl butanoate, butyl 2-methoxymethyl-3,3-dimethyl butanoate, pentyl 2-methoxymethyl-3,3-dimethyl butanoate, hexyl 2-methoxymethyl-3,3-dimethyl butanoate, octyl 2-methoxymethyl-3,3-dimethyl butanoate, methyl 3-methoxy-2-phenyl propionate, ethyl 3-methoxy-2-phenyl propionate, propyl 3-methoxy-2-phenyl propionate, butyl 3-methoxy-2-phenyl propionate, pentyl 3-methoxy-2-phenyl propionate, hexyl 3-methoxy-2-phenyl propionate, octyl 3-methoxy-2-phenyl propionate, methyl 2-ethoxymethyl-3,3-dimethyl butanoate, ethyl 2-ethoxymethyl-3,3-dimethyl butanoate, propyl 2-ethoxymethyl-3,3-dimethyl butanoate, butyl 2-ethoxymethyl-3,3-dimethyl butanoate, pentyl 2-ethoxymethyl-3,3-dimethyl butanoate, hexyl 2-ethoxymethyl-3,3-dimethyl butanoate, octyl 2-ethoxymethyl-3,3-dimethyl butanoate, methyl 3-ethoxy-2-phenyl propionate, ethyl 3-ethoxy-2-phenyl propionate, propyl 3-ethoxy-2-phenyl propionate, butyl 3-ethoxy-2-phenyl propionate, pentyl 3-ethoxy-2-phenyl propionate, hexyl 3-ethoxy-2-phenyl propionate, octyl 3-ethoxy-2-phenyl propionate, methyl 2-propyloxymethyl-3,3-dimethyl butanoate, ethyl 2-propyloxymethyl-3,3-dimethyl butanoate, propyl 2-propyloxymethyl-3,3-dimethyl butanoate, butyl 2-propyloxymethyl-3,3-dimethyl butanoate, pentyl 2-propyloxymethyl-3,3-dimethyl butanoate, hexyl 2-propyloxymethyl-3,3-dimethyl butanoate, octyl 2-propyloxymethyl-3,3-dimethyl butanoate, methyl 3-propyloxy-2-phenyl propionate, ethyl 3-propyloxy-2-phenyl propionate, propyl 3-propyloxy-2-phenyl propionate, butyl 3-propyloxy-2-phenyl propionate, pentyl 3-propyloxy-2-phenyl propionate, hexyl 3-propyloxy-2-phenyl propionate, octyl 3-propyloxy-2-phenyl propionate, methyl 2-methoxybenzene carboxylate, ethyl 2-methoxybenzene carboxylate, propyl 2-methoxybenzene carboxylate, butyl 2-methoxybenzene carboxylate, pentyl 2-methoxybenzene carboxylate, hexyl 2-methoxybenzene carboxylate, octyl 2-methoxybenzene carboxylate, methyl 2-ethoxybenzene carboxylate, ethyl 2-ethoxybenzene carboxylate, propyl 2-ethoxybenzene carboxylate, butyl 2-ethoxybenzene carboxylate, pentyl 2-ethoxybenzene carboxylate, hexyl 2-ethoxybenzene carboxylate, and octyl 2-ethoxybenzene carboxylate.

Examples of the diether compounds include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-ethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl)fluorene, 9,9-bis(ethoxymethyl)fluorene, 9,9-bis(propyloxymethyl)fluorene, 9,9-bis(butoxymethyl)fluorene, 9,9-bis-tert-butoxymethyl fluorene, 9,9-bis(phenoxymethyl)fluorene, 9,9-bis(benzyloxymethyl)fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, and 1,2-dibenzyloxybenzene.

Further, the inner electron donor described in JP-A-2011-246699 may be applied.

It is preferable that the inner electron donor be dicarboxylic ester compounds, diol diester compounds, and β-alkoxyester compounds. The inner electron donors may be used solely, or two or more of the inner electron donors may be used in combination.

Examples of the organic aluminum compounds include a compound described in JP-A-10-212319. It is preferable that the organic aluminum compound be a trialkylaluminum, a mixture of a trialkylaluminum and a dialkylaluminum halide, or an alkylalumoxane. It is more preferable that the organic aluminum compound be triethylaluminum, triisobutylaluminum, a mixture of triethylaluminum and diethylaluminum chloride, or tetraethyldialumoxane.

Examples of the external electron donor include compounds described in JP-B2-2950168, and JP-A-2006-96936, JP-A-2009-173870, and JP-A-2010-168545. The external electron donor is preferably an oxygen-containing compound or a nitrogen-containing compound. Examples of the oxygen-containing compound include alkoxy silicons, ethers, esters, and ketones. It is preferable that the oxygen-containing compound be an alkoxy silicon or an ether, and examples of the oxygen-containing compound include cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, isobutyltriethoxysilane, vinyltriethoxysilane, sec-butyltriethoxysilane, cyclohexyltriethoxysilane, or cyclopentyltriethoxysilane.

It is preferable that the solvent be an inert hydrocarbon such as propane, butane, isobutane, pentane, isopentane, hexane, heptane, octane, cyclohexane, benzene, toluene, or the like.

The production method of the heterophasic propylene polymerization material may include polymerizing a small amount of olefin in a presence of the solid catalyst component and the organic aluminum compound, so as to produce a catalyst component whose surface is covered with a polymer of the olefin (this polymerization is usually referred to as preliminary polymerization, and thus the catalyst component is usually referred to as preliminary polymerization catalyst component). The olefin used in the preliminary polymerization is at least one of the olefin(s) constituting the heterophasic propylene polymerization material. The preliminary polymerization may include adjusting a molecular weight of the produced polymer of the olefin by using a chain transfer agent such as hydrogen, or using an external electron donor.

In one embodiment, the preliminary polymerization is such that the organic aluminum compound is preferably in a range of 0.1 to 700 mol, or preferably 0.2 to 200 mol per one mole of a transition metal atom contained in the solid catalyst component. The external electron donor is preferably in a range of 0.01 to 400 mol per one mole of the transition metal atom contained in the solid catalyst component. The solid catalyst component contained per 1 L of the solvent is preferably in a range of 1 to 500 g. Usually, an amount of the olefin for the preliminary polymerization is in a range of 0.1 to 200 g per 1 g of the solid catalyst component.

One exemplary embodiment may be configured by including performing multi-stage polymerization to produce the propylene copolymer (I) and performing multi-stage polymerization to produce the ethylene-α-olefin copolymer (II-1) and the ethylene-α-olefin copolymer (II-2). More specifically, one exemplary embodiment may be configured by including producing the propylene copolymer (I) by multi-stage polymerization using a vessel-type reactor and a vapor-phase reactor, then producing the ethylene-α-olefin copolymer (II-1) by using a vapor-phase reactor, and then producing the ethylene-α-olefin copolymer (II-2) by using a vapor-phase reactor.

In a first stage of the production of the propylene copolymer (I), a vessel-type reactor may be used, for example. A polymerization temperature thereof may be in a range of 0 to 120° C., for example. A polymerization pressure thereof may be in a range of an atmospheric pressure to 10 MPaG, for example.

In a second stage of the production of the propylene copolymer (I), a vapor-phase reactor may be used, for example. For example, a polymerization temperature thereof may be preferably in a range of 40 to 80° C., or more preferably in a range of 40 to 75° C. For example, a polymerization pressure thereof may be preferably in a range of an atmospheric pressure to 10 MPaG, or more preferably in a range of an atmospheric pressure to 2.0 MPaG.

In the production of the ethylene-α-olefin copolymer (II-1), a vapor-phase reactor may be used, for example. For example, a polymerization temperature thereof may be preferably in a range of 0 to 120° C. For example, a polymerization pressure thereof may be preferably in a range of an atmospheric pressure to 10 MPaG, or more preferably in a range of an atmospheric pressure to 2.0 MPaG.

In the production of the ethylene-α-olefin copolymer (II-2), a vapor-phase reactor may be used, for example. For example, a polymerization temperature thereof may be preferably in a range of 0 to 120° C. For example, a polymerization pressure thereof may be preferably in a range of an atmospheric pressure to 10 MPaG, or more preferably in a range of an atmospheric pressure to 2.0 MPaG.

<Propylene Resin Composition>

The heterophasic propylene polymerization material may be fabricated into a propylene resin composition including the heterophasic propylene polymerization material and another component in combination.

One preferable aspect of such a propylene resin composition according to the present invention is a propylene resin composition including the heterophasic propylene polymerization material and a thermoplastic elastomer (III) for the sake of the impact strength of a molded article or for the sake of more black appearance attainable when the propylene resin composition is fabricated into a black molded article having an emboss-designed surface.

A content of the thermoplastic elastomer (III) in the propylene resin composition may be preferably in a range of 10 to 60 parts by weight, or more preferably in a range of 20 to 50 parts by weight, with respect to 100 parts by weight of a content of the heterophasic propylene polymerization material therein.

Examples of the thermoplastic elastomer (III) include olefin-based thermoplastic elastomers and styrene-based thermoplastic elastomers.

Examples of the olefin-based thermoplastic elastomers include a propylene-1-butene copolymer, and an ethylene-propylene copolymer that has a density of less than 0.880 g/cm$^3$. The propylene-1-butene copolymer may be preferably configured such that a content of a monomer unit derived from 1-butene is not less than 4 wt % but not more than 10 wt %. A content of a monomer unit derived from the ethylene in the ethylene-propylene copolymer that has a density of less than 0.880 g/cm$^3$ may be preferably in a range of not less than 4 wt % but not more than 10 wt %.

In this Description, what is meant by the styrene-based thermoplastic elastomer is a block copolymer having a polymer block including a monomer unit derived from an aromatic vinyl compound and a polymer block including a monomer unit derived from a conjugated diene compound, and such a block copolymer hydrogenated. Examples of the styrene-based thermoplastic elastomer include a styrene-butadiene-styrene-block copolymer, a styrene-isoprene-styrene block copolymer, and a styrene-ethylene-butylene-styrene block copolymer, and the like.

The thermoplastic elastomer (III) may preferably include at least one kind of polymer selected from the group consisting of the ethylene-propylene copolymer with a density of less than 0.880 g/cm$^3$ and the propylene-1-butene copolymer.

It is preferable that the propylene resin composition including the heterophasic propylene polymerization material and the thermoplastic elastomer (III) further include a filler (D) as described below.

One aspect of the propylene resin composition according to the present invention is a propylene resin composition including the heterophasic propylene polymerization material and a filler (D). Examples of the filler (D) include inorganic fibers and organic fibers. The filler (D) may be preferably inorganic fibers.

Examples of the inorganic fibers include glass fibers and carbon fibers. Examples of the organic fibers include polyester fibers and aramid fibers.

The filler (D) in the propylene resin composition according to the present invention may have an average length preferably in a range of 400 to 800 μm, or more preferably in a range of 450 to 700 μm.

In this Description, what is meant by the average length of the filler (D) in the propylene resin composition is a weight average fiber length measured by the method described in JP-A-2002-5924.

The average length of the filler (D) in the propylene resin composition can be appropriately controlled by adjusting a mixing and kneading strength in producing the propylene resin composition by melting, mixing, and kneading. For example, use of a twin-screw extruder provides a greater mixing and kneading strength than use of a single-screw extruder, thereby making it possible to provide a shorter average length of the filler (D) compared with before the extrusion. Moreover, an extruder with deeper screw channels can provide a weaker mixing and kneading strength, thereby making it possible to provide a longer average length of the filler (D).

In the propylene resin composition according to the present invention, from the viewpoint of strength, heat resistance, dimensional stability and weight reduction of a molded product made of the propylene resin composition, a content of the filler (D) may be preferably not less than 1 part by weight but not more than 30 parts by weight, more preferably in a range of 1 to 20 parts by weight, or further preferably in a range of 1 to 15 parts by weight, with respect to 100 parts by weight of the polymer component in the propylene resin composition therein.

One aspect of the propylene resin composition according to the present invention is a propylene resin composition including the heterophasic propylene polymerization material and an olefin-based polymer other than the propylene copolymer (I), the ethylene-α-olefin copolymer (II-1), and the ethylene-α-olefin copolymer (II-2). Examples of the olefin-based polymer include an ethylene-based polymer. In this Description, what is meant by the ethylene-based polymer is a polymer in which a content of a monomer unit derived from ethylene is greater than 50 wt %. Examples of the ethylene-based polymer include an ethylene homopolymer, a copolymer of ethylene and propylene, a copolymer of ethylene and a C$_4$ to C$_{20}$ α-olefin, an ethylene-vinyl acetate copolymer, an ethylene-ethyl acrylate copolymer, an ethylene-methacrylate copolymer, and the like. Examples of the ethylene homopolymer may include a low-density polyethylene, a medium-density polyethylene, and a high-density polyethylene. Examples of the copolymer of ethylene and a C$_4$ to C$_{20}$ α-olefin include an ethylene-1-butene copolymer, an ethylene-1-pentene copolymer, an ethylene-1-hexene copolymer, an ethylene-1-octene copolymer, and the like.

The olefin-based polymer may include one kind of olefin-based polymer or two or more kinds of olefin-based polymers. An amount of the olefin-based polymer blended in may be preferably in a range of 0.1 to 40 wt %, or more preferably in a range of 1 to 30 wt %, with respect to the whole heterophasic propylene polymerization material.

The heterophasic propylene polymerization material according to the present invention may include, if necessary, an additive such as a heat stabilizing agent, an ultraviolet stabilizing agent, an anti-oxidant, a crystal nucleating agent, a lubricant, a coloring agent, an anti-blocking agent, an anti-static agent, an anti-fog agent, a flame retardant, a petroleum resin, a foaming agent, a foaming auxiliary agent, and an organic or inorganic filler. An amount of the additive added therein may be preferably not less than 0.01 wt %, but preferably not more than 30 wt %, with respect to the whole heterophasic propylene polymerization material. The additive may include one kind of additive, or may include two or more kinds of additives in combination at an arbitrary ratio.

Examples of the coloring agent include inorganic pigments and organic pigments. Examples of the inorganic pigments include carbon black, iron oxide, titanium oxide, zinc oxide, Bengala, cadmium red, cadmium yellow, azurite, cobalt blue, titanium yellow, white lead, red lead, chrome yellow, Prussian blue, and the like. Examples of the organic pigments include quinacridone, polyazo yellow, anthraquinone yellow, polyazo red, azo lake Yellow, perylene, Phthalocyanine green, Phthalocyanine blue, isoindoline yellow, and the like. An amount of the coloring agent added therein may be preferably not less than 0.05 wt %, but preferably not more than 5 wt %, with respect to the whole heterophasic propylene polymerization material.

Examples of a production method of the propylene resin composition according to the present invention include the following examples, which will be explained based on examples including adding the coloring agent for the sake of exemplification:

(1) a method including dry-blending a predetermined amount of the heterophasic propylene polymerization material, and the thermoplastic elastomer, the filler, the coloring agent, and another component, which are added if necessary, and after that, melting, mixing and kneading a mixture thus dry-blended, (2) a method including adding, directly into an extruder of a molding machine during a production process of a molded article, the heterophasic propylene polymerization material, and the thermoplastic elastomer, the filler, the coloring agent, and another component, which are added if necessary, so as to mix and knead a mixture thus added therein, and the like method.

Moreover, the production of the propylene resin composition according to the present invention may employ a master batch including a thermoplastic resin containing the coloring agent at an adjusted concentration.

The heterophasic propylene polymerization material according to the present invention is suitably applicable to molding methods such as extrusion molding, injection molding, compression molding, foaming molding, hollow molding, blow molding, vacuum molding, powder molding, calendar molding, inflation method, and press molding.

Examples of applications of the heterophasic propylene polymerization material according to the present invention includes automobile parts such as interior parts and exterior parts of automobiles, food and medical containers, parts of furniture and electric products, civil engineer and building materials, and the like. Examples of the interior parts of automobiles include instrumental panels, trims, door panels, side protector, console boxes, column covers, and the like. Examples of the exterior parts of automobiles include bumpers, fenders, wheel cover, and the like. Examples of the food and medical containers include plastic wraps, food containers, infusion solution bags, infusion solution bottles, and the like. Examples of the furniture and home appliances include wall paper, flooring materials, flexible decorative laminates, drainage hoses for washing machines, and the like. Examples of the civil engineer and building materials include water-proof sheets, leakage isolation sheets, hoses, ducts, gaskets, and the like. The leakage isolation sheets are sheets for use in final disposal sites where the leakage isolation sheet is installed to prevent leakage of water such as water contained in wastes or rain water.

The embodiments of the present invention will be described in more detail, referring to Examples below. Needless to say, the present invention is not limited to Examples below, and may be modified in various ways in terms of details thereof. Moreover, the present invention is not limited to the embodiments described above, and may be modified in various ways within the scope of the Claims, and the technical scope of the present invention also encompasses embodiments obtainable by appropriately combining the technical means separately disclosed herein. Moreover, the contents of all the literatures mentioned in this Description are incorporated herein by reference.

EXAMPLES

Measurement values of the items mentioned in the Mode for Carrying Out the Invention and the Examples and Comparative Examples were measured by methods described below.

(1) Limiting viscosity ([η], Unit: dL/g)

A limiting viscosity of the whole heterophasic propylene polymerization material, a limiting viscosity of the propylene copolymer (I), a limiting viscosity of the xylene insoluble component of the heterophasic propylene polymerization material, and a limiting viscosity of the xylene soluble component of the heterophasic propylene polymerization material By using an Ubbelohde viscometer, reduced viscosities at three points of concentrations of 0.1 g/dL, 0.2 g/dL, and 0.5 g/dL were measured. The limiting viscosity was worked out by the calculation method described on a reference literature "Polymer Solution, Polymer Experiment 11" (Kobunshi Yoeki, Kobunshi Jikkengaku 11) (published in 1982, KYORITSU SHUPPAN CO., LTD.), item 491, that is, an extrapolation method including plotting the reduced viscosities against the concentration and performing extrapolation of the concentrations to zero. The measurement was carried out at a temperature of 135° C. with tetralin as a solvent.

(2) Content of Monomer Unit Derived from Ethylene (Unit: wt %)

A content of the monomer unit derived from ethylene in the heterophasic propylene polymerization material with respect to 100 wt % of the whole weight of the heterophasic propylene polymerization material, a content of the monomer unit derived from ethylene in the propylene copolymer (I) with respect to 100 wt % of the whole weight of the propylene copolymer (I), a content of the monomer unit derived from ethylene in the ethylene-α-olefin copolymer (II-1) with respect to 100 wt % of the whole weight of the ethylene-α-olefin copolymer (II-1), and a content of the monomer unit derived from ethylene in the ethylene-α-olefin copolymer (II-2) with respect to 100 wt % of the whole weight of the ethylene-α-olefin copolymer (II-2) were measured under the following conditions. The contents were worked out from $^{13}$C-NMR spectrum, according to the reports from Kakugo et al. (reference literature: Macromolecules 1982, 15, 1150-1152).

<Carbon Nuclear Magnetic Resonance ($^{13}$C-NMR) Measurement Conditions>

Apparatus: AVANCE III 600HD made by Bruker BioSpin
Measurement Probe: 10 mm CryoProbe
Measurement Solvent: A mixture solution of 1,2-dichlorobenzene/1,1,2,2-tetrachloroethane-$d_2$=85/15 (volumetric ratio)
Sample Concentration: 100 mg/mL
Measurement Temperature: 135° C.
Measurement Method: Proton decoupling Method
Accumulation Number: 256 times
Pulse Width: 45 degrees
Pulse Repetition Period: 4 seconds
Measurement Control: Tetramethyl silane (3) Xylene Insoluble Component (CXIS, Unit: wt %)

A solution was prepared by completely dissolving 2 g of the heterophasic propylene polymerization material in 2000 mL of boiled xylene, and then was allowed to cool down to 25° C. and left to stand as such. After that, a solid precipitated in the solution at 25° C. was filtered out, and dried at 80° C. under reduced pressure, thereby obtaining the xylene insoluble component.

(4) Xylene Soluble Component (CXS, Unit: wt %)

A solution was prepared by completely dissolving 2 g of the heterophasic propylene polymerization material in 2000 mL of boiled xylene, and then was allowed to cool down to 25° C. and left to stand as such. After that, a solid precipitated in the solution at 25° C. was filtered out, and a filtrate thus obtained was concentrated and dried to a solid thereby to evaporate off xylene, and further dried at 80° C. under reduced pressure, thereby obtaining the xylene soluble component.

(5) Melt Flow Rate (MFR, Unit: g/10 min)

The melt flow rates were measured according to the method stipulated in JIS K6758. The measurement was carried out at a measurement temperature of 230° C. with a load of 2.16 kg.

(6) Molding of Molded Article for Outer Appearance Evaluation

Molding conditions (injection molding device, mold, conditions) of molded articles and evaluation methods for use in the following outer appearance evaluation (1) and outer appearance evaluation (2) were as below.

(6-1-1) Injection Molding Device, Mold, and Molding Conditions Used for Preparing Molded Article for Outer Appearance Evaluation (1)

Injection Molding Device: SE180D with a mold clamping force of 180 ton, made by Sumitomo Heavy Industries, Ltd.
Molding Temperature: 220° C.
Mold: for a plate-shaped molded product with 3 mm thickness, one-point gate, One-side Emboss-design finish
Product Size: 100 mm×400 mm×3 mm thickness
Mold Temperature: 50° C.

(6-1-2) Injection Molding Device, Mold, and Molding Conditions Used for Preparing Molded Article for Outer Appearance Evaluation (2)

Injection Molding Device: SE130DU with a mold clamping force of 130 ton, made by Sumitomo Heavy Industries, Ltd.

Molding Temperature: 230° C.

Mold: for a plate-shaped molded product with 3 mm thickness, one-point gate, One-side mirror finish Product Size: 90 mm×150 mm×3 mm thickness Mold Temperature: 50° C.

(6-2-1) Outer Appearance Evaluation (1)

Brightness of the emboss-designed surface of the molded article for the outer appearance evaluation (1) thus obtained in (6-1-1) above was measured as below.

Measurement Device: BYK-mac, made by BYK-Gardener

Measurement of Brightness: Brightness of reflective light rays reflected respectively at 15° and 110° (brightness (15°) and brightness (110°)) were measured with respect to a standard line that was at a regular reflection angle of incident light. An outer appearance index defined by the following Equation (4) was worked out. A molded article with a greater outer appearance index has a more black appearance and therefore is preferable.

$$\text{Outer Appearance Index}=100-(\text{Brightness }(15°)-\text{Brightness }(110°)) \quad \text{Equation (4)}$$

(6-2-2) Outer Appearance Evaluation (2)

The mirror finish surface of the molded article for the outer appearance evaluation (2) thus obtained in (6-1-2) above was visually observed after the molded article was held in conditions of 23° C. and relative humidity of 50% for 120 hours, so as to compare the mirror finish surface of the molded article before and after the holding in order to observe whether or not there was a change before and after the holding.

(7) Measurement Method of Izod Impact Strength (7-1) Injection Molder, Mold, and Molding Conditions A molded article for Izod impact strength measurement was molded under the following conditions.

Injection Molding Device: SE130DU with a mold clamping force of 130 ton, made by Sumitomo Heavy Industries, Ltd.

Molding Temperature: 220° C.

Mold: Mold for ASTM test

Mold Temperature: 50° C.

(7-2) Izod Impact Strength (Unit: kJ/m2)

The Izod impact strength was measured at a temperature of −30° C. according to ASTM D526.

Example 1

[Preparation of Solid Catalyst Component]

Step (1-1A): After a 100-mL flask with a stirrer, a dropping funnel, and a thermometer was replaced with nitrogen, 36.0 mL of toluene and 22.5 mL of titanium tetrachloride were added and stirred in the flask, thereby obtaining a titanium tetrachloride solution. After the content in the flask was cooled to 0° C., 1.88 g of magnesium diethoxide was added 4 times with 30-min intervals at 0° C., and a mixture thus obtained was stirred at 0° C. for 1.5 hours. Then, 0.60 mL of 2-ethoxymethyl-3,3-dimethylethylbutyrate was added in the flask and the content in the flask was increased to 10° C. After that, the content was stirred at 10° C. for 2 hours, and then 9.8 mL of toluene was added. Next, the content in the flask was heated up, and 3.15 mL of 2-ethoxymethyl-3,3-dimethylethylbutyrate was added therein when the temperature was 60° C., and the heating was continued up to 110° C. A mixture thus obtained in the flask was stirred at 110° C. for 3 hours.

A mixture thus obtained was subjected to solid-liquid separation, thereby obtaining a solid. The solid was washed with 56.3 mL of toluene 3 times at 100° C.

Step (1-1B): To the solid after the washing, 38.3 mL of toluene was introduced, thereby forming a slurry. To the slurry, 15.0 mL of titanium tetrachloride and 0.75 mL of ethyl 2-ethoxymethyl-3,3-dimethyl butanoate were introduced, thereby obtaining a mixture, and the mixture was stirred at 110° C. for 1 hour. After that, the mixture thus stirred was subjected to solid-liquid separation, and resultant solid was washed at 60° C. with 56.3 mL of toluene 3 times, and further washed at a room temperature with 56.3 mL of hexane three times. The solid after the washing was dried under reduced pressure, thereby obtaining a solid catalyst component.

The solid catalyst component was such that titanium atom content was 2.53 wt %, ethoxy group content was 0.44 wt %, and internal electron donor content was 13.7 wt %. Furthermore, the solid catalyst component was such that a median particle size was 59.5 μm measured by the laser diffraction and scattering method, and had such a particle size distribution that cumulative percentage of particles of 10 μm or less was 5.3% where the particle size distribution was on the basis of volume. XPS analysis showed that an amount of a peak component having a bonding energy derived from the 1 s orbital of an oxygen atom and peaked within a range of 532 to 534 eV was 85.0%, and an amount of a peak component having a bonding energy derived from the 1 s orbital of an oxygen atom and peaked within a range of 529 to 532 eV was 15.0%. A mercury press-in method showed that a total pore volume was 1.43 mL/g, a total volume of pores with pore diameters in a range of 5 to 30 nm was 0.160 mL/g, a total volume of pores with pore diameters in a range of 30 to 700 nm was 0.317 mL/g, and a specific surface area was 107.44 m²/g.

(A-1) Heterophasic Propylene Polymerization Material (A-1a) Prepolymerization

Into an SUS-made autoclave with an internal volume of 3 L equipped with a stirrer, 1.1 L of n-hexane, 22 mmol of triethylaluminum, and 2.2 mmol of tert-butyl-n-propyldimethoxysilane, which were sufficiently dehydrated and deaerated, were added. After 6 g of the solid catalyst above was added therein, 6 g of propylene was added over 30 min continuously with the temperature of the autoclave kept at about 10° C. In this way, the prepolymerization was carried out. After that, a prepolymerization slurry thus obtained was transferred into an SUS316L-made autoclave with an internal volume of 260 L equipped with a stirrer, and 184 L of liquid butane was added therein, thereby preparing a slurry of a prepolymerization catalyst component.

(A-1b) Main Polymerization

In a device provided with a slurry polymerization reactor and three vapor phase reactors connected in tandem, a propylene copolymer (Ia) was prepared by a polymerization step I as described below and a polymerization step II as described below, and the propylene copolymer (Ia) thus produced was transferred to downstream stages without deactivation and an ethylene-α-olefin copolymer (II-1a), and an ethylene-α-olefin copolymer (II-2a) were prepared by a polymerization step III-1 as described below and a polymerization step III-2 as described below.

[Polymerization Step I (Propylene-Ethylene Copolymerization Using an Olefin Prepolymerization Reactor)]

By using the slurry polymerization reactor of a vessel type, made of SUS304 and equipped with a stirrer, copolymerization of propylene and ethylene was carried out. That is, the polymerization reaction was carried out with propylene, ethylene, hydrogen, triethylaluminum, tert-butyl-n-propyldimethoxysilane, and the slurry of the prepolymerization catalyst component thus produced in (1-1a) continuously supplied into the reactor. Reaction conditions thereof were as below.

Polymerization Temperature: 50° C.
Stirring Speed: 150 rpm
Liquid Level in the Reactor: 26 L
Supplying Amount of Propylene: 20 kg/hour
Supplying Amount of Ethylene: 0.03 kg/hour
Supplying Amount of Hydrogen: 40.0 NL/hour
Supplying Amount of Triethylaluminum: 17.8 mmol/hour
Supplying Amount of tert-butyl-n-propyldimethoxysilane: 3.45 mmol/hour
Supplying Amount of the slurry of the prepolymerization catalyst component (based on the polymerization catalyst catalyst): 0.30 g/hour
Polymerization Pressure: 3.15 MPa (gauge pressure)

[Polymerization Step II (Propylene-Ethylene Copolymerization (Vapor Polymerization) Using Multi-Stage Vapor Polymerization Reactor)]

As the multi-stage vapor polymerization reactor, a multi-stage vapor polymerization reactor with 6 stages of reaction regions connected in the vertical direction, an uppermost one of which was a fluidized bed, and remaining 5 of which were spouted beds was provided.

From the slurry polymerization reactor of the preceding stage, the slurry containing the polypropylene particles and the liquid propylene was continuously supplied to the fluidized-bed type uppermost stage of the multi-staged gas phase polymerization reactor without inactivating the slurry.

The transfer of the polypropylene particles from one stage to another within the multi-staged gas-phase polymerization reactor was carried out by a double-valve method.

This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the powders are moved into a space between the on-off valves from the upstream reaction region and retained in the space, and after the upstream on-off valve is closed thereafter, the downstream on-off valve is opened, so that the polypropylene particles are moved into the downstream reaction region.

From a lower part of the multi-staged gas phase polymerization reactor configured as above, propylene, ethylene, and hydrogen were continuously supplied.

While, with this configuration, the fluidized bed and the spouted beds were formed in the corresponding reaction regions, and the supplying rates of propylene, ethylene, and hydrogen were controlled in such a way as to maintain gas composition and pressure constant, and propylene-ethylene copolymerization was further carried out while purging excess gas. Reaction conditions thereof were as below.

Polymerization temperature: 60° C.
Polymerization pressure: 1.40 MPa (Gauge pressure)
In the reactor, concentration ratios of in-reactor gases were
such that ethylene/(hydrogen+propylene+ethylene)=4.3 mol %, and hydrogen/(hydrogen+propylene+ethylene)=14.2 mol %.

[Polymerization Step III-1 (Propylene-Ethylene Copolymerization (Vapor Polymerization) Using Fluidized Bed-Type Reactor)]

The polypropylene particles discharged from the multi-stage vapor phase polymerization reactor of the preceding stage were continuously supplied to a fluidized bed-type reactor serving as the fluidized bed-type olefin polymerization reactor.

The fluidized bed-type reactor of the polymerization step III-1 had one stage of fluidized-bed reaction region in the vertical direction, and transfer means for transferring the polypropylene particles from the multi-stage vapor phase polymerization reactor of the preceding stage to the fluidized bed-type reactor was carried out by the double-valve method described above.

While continuously supplying propylene, ethylene, and hydrogen into the fluidized bed-type reactor configured as above, and maintaining gas composition and pressure constant by controlling the supplying rates of the gases and by purging excess gas, copolymerization of propylene and ethylene was carried out in the presence of polypropylene particles. Reaction conditions thereof were as below.

Polymerization temperature: 70° C.
Polymerization pressure: 1.37 MPa (Gauge pressure)
In the reactor, concentration ratios of in-reactor gases were such that ethylene/(hydrogen+propylene+ethylene) was 23.1 mol %, and hydrogen/(hydrogen+propylene+ethylene) was 2.37 mol %.

[Polymerization Step III-2 (Propylene-Ethylene Copolymerization (Vapor Polymerization) Using Fluidized Bed-Type Reactor)]

The polypropylene particles discharged from the fluidized bed-type reactor of the polymerization step III-1 were continuously supplied to a fluidized bed-type reactor of a further following stage.

The fluidized bed-type reactor of the polymerization step III-2 had one stage of fluidized-bed reaction region in the vertical direction, and transfer means for transferring the polypropylene particles from the fluidized bed-type reactor of the polymerization step III-1 to the fluidized bed-type reactor of the polymerization step III-2 was carried out by the double-valve method.

The copolymerization of propylene and ethylene was carried out in a similar manner to that in Polymerization Step III-1 except the following conditions, thereby obtaining a heterophasic propylene polymerization material (A-1).

Polymerization temperature: 70° C.
Polymerization pressure: 1.33 MPa (Gauge pressure)
In the reactor, concentration ratios of in-reactor gases were such that ethylene/(hydrogen+propylene+ethylene) was 22.7 mol %, and hydrogen/(hydrogen+propylene+ethylene) was 0.07 mol %.

The composition of the heterophasic propylene polymerization material

Content of Propylene Copolymer (Ia): 57.1 wt %
Content of Ethylene-Propylene Copolymer (II-1a): 28.1 wt %
Content of Ethylene-Propylene Copolymer (II-2a): 14.8 wt %
Contents of Monomer unit derived from Ethylene
Content of the monomer in the Propylene Copolymer (Ia): 5.8 wt %
Content of the monomer in Ethylene-Propylene Copolymer (II-1a): 21.9 wt %
Content of the monomer in Ethylene-Propylene Copolymer (II-2a): 19.9 wt %
Limiting Viscosities
Propylene Copolymer (Ia): 0.9 dL/g
Ethylene-Propylene Copolymer (II-1a): 2.4 dL/g
Ethylene-Propylene Copolymer (II-2a): 7.3 dL/g
Limiting Viscosity of CXS Component/Limiting viscosity of CXIS Component: 1.9

Molecular Weight Distribution (Mw/Mn) of CXS component in Heterophasic Propylene Polymerization Material (A-1): 16.4

$$Y \leq 4.37X - 32.4 \quad (3)$$

X=21.2

Right side of Equation (3)=4.37×21.2−32.4=60.2

Y=42.9

Example 2

After 100 parts by weight of the heterophasic propylene polymerization material (A-1) thus obtained in Example 1, 0.05 parts by weight of calcium stearate (made by NOF CORPORATION), 0.1 parts by weight of octadecyl-3-(3,5-di-tert-butyl-4-hydroxyphenyl)propionate, 0.1 parts by weight of 6-[3-(3-tert-butyl-4-hydroxy-5-methylphenyl)propoxy]-2,4,8,10-tetra-tert-butyldibenzo[d,f][1.3.2]dioxaphosphepin (SUMILIZER GP, made by Sumitomo Chemical Company, Limited), 0.37 parts by weight of organic peroxide master batch (a mixture of 8 parts by weight of 2,5-dimethyl-2,5-bis(tert-butyl peroxy)hexane and 92 parts by weight of a propylene homopolymer) were mixed, a mixture thus obtained was melted, mixed and kneaded by using a single-screw extruder (made by TANABE PLASTICS MACHINERY CO., LTD., barrel internal diameter: 40 mm, screw speed: 100 rpm, and cylinder temperature: 250° C.), thereby obtaining a melted, mixed and kneaded product, which was then extruded from a die part. An extrusion product thus obtained was cooled to solidify with cool water, and cut, thereby obtaining pellets of a resin composition (B-1).

Melt flow rate of the resin composition (B-1): 21.5 g/10 min

A mixture of 100 parts by weight of the resin composition (B-1) and 10 parts by weight of black master batch containing carbon black was mixed and molded by the method described in (6-1-1), thereby obtaining a molded article for the outer appearance evaluation (1). The molded article for the outer appearance evaluation (1) was evaluated by the method described in (6-2-1), finding that an outer appearance index thereof was 77.

A mixture of 100 parts by weight of the resin composition (B-1) and 10 parts by weight of black master batch containing carbon black was mixed and molded by the method described in (6-1-2), thereby obtaining a molded article for the outer appearance evaluation (2). The molded article for the outer appearance evaluation (2) was evaluated by the method described in (6-2-2). The observation found no changes in the outer appearance of the mirror finish of molded article before and after holding the molded article for the outer appearance evaluation (2) at 23° C. in relative humidity of 50% for 120 hours.

A mixture of 100 parts by weight of the resin composition (B-1) and 10 parts by weight of black master batch containing carbon black was mixed and molded by the method described in (7-1), thereby obtaining a molded article for Izod impact strength measurement. Evaluation by the method described in (7-2) above found that the Izod impact strength of the molded article for Izod impact strength measurement was 10.2 kJ/m².

Example 3

After 70 parts by weight of the heterophasic propylene polymerization material (A-1) thus obtained in Example 1, 30 parts by weight of a thermoplastic elastomer (Versify 4200, density: 0.876 g/cm³, an ethylene-propylene copolymer, made by The Dow Chemical Company), 0.05 parts by weight of calcium stearate (made by NOF CORPORATION), 0.1 parts by weight of octadecyl-3-(3,5-di-tert-butyl-4-hydroxyphenyl)propionate, 0.1 parts by weight of 6-[3-(3-tert-butyl-4-hydroxy-5-methylphenyl)propoxy]-2,4,8,10-tetra-tert-butyldibenzo[d,f][1.3.2]dioxaphosphepin (SUMILIZER GP, made by Sumitomo Chemical Company, Limited) were mixed, a mixture thus obtained was melted, mixed and kneaded by using a twin-screw extruder ((Registered Trademark) TEX44αII: made by The Japan Steel Works, LTD., barrel internal diameter: 44 mm, screw speed: 300 rpm, and cylinder temperature: 200° C.), thereby obtaining a melted, mixed and kneaded product, which was then extruded from a die part. An extrusion product thus obtained was cooled to solidify with cool water, and cut, thereby obtaining pellets of a resin composition (B-2).

Melt flow rate of the resin composition (B-2): 4.8 g/10 min

A mixture of 100 parts by weight of the resin composition (B-2) and 10 parts by weight of black master batch containing carbon black was molded by the method described in (6-1-1), thereby obtaining a molded article for the outer appearance evaluation (1). The molded article for the outer appearance evaluation (1) was evaluated by the method described in (6-2-1), finding that an outer appearance index thereof was 81.

A mixture of 100 parts by weight of the resin composition (B-2) and 10 parts by weight of black master batch containing carbon black was mixed and molded by the method described in (6-1-2), thereby obtaining a molded article for the outer appearance evaluation (2). The molded article for the outer appearance evaluation (2) was evaluated by the method described in (6-2-2). The observation found no changes in the outer appearance of the mirror finish of molded article before and after holding the molded article for the outer appearance evaluation (2) at 23° C. in relative humidity of 50% for 120 hours.

A mixture of 100 parts by weight of the resin composition (B-2) and 10 parts by weight of black master batch containing carbon black was mixed and molded by the method described in (7-1), thereby obtaining a molded article for Izod impact strength measurement. Evaluation by the method described in (7-2) above found that the Izod impact strength of the molded article for Izod impact strength measurement was 4.4 kJ/m².

Example 4

(A-2) Heterophasic Propylene Polymerization Material (A-2a) Prepolymerization

Into an SUS-made autoclave with an internal volume of 3 L equipped with a stirrer, 1.1 L of n-hexane, 22 mmol of triethylaluminum, and 2.2 mmol of tert-butyl-n-propyldimethoxysilane, which were sufficiently dehydrated and deaerated, were added. After 6 g of the solid catalyst component prepared similarly as Example 1 was added therein, 6 g of propylene was added over 30 min continuously with the temperature of the autoclave kept at about 10° C. In this way, the prepolymerization was carried out. After that, a prepolymerization slurry thus obtained was transferred into an SUS316L-made autoclave with an internal volume of 260 L equipped with a stirrer, and 184 L of liquid butane was added therein, thereby preparing a slurry of a prepolymerization catalyst component.

(A-2b) Main Polymerization

In a device provided with a slurry polymerization reactor and three vapor phase reactors connected in tandem, a propylene copolymer (Ib) was prepared by a polymerization step I as described below and a polymerization step II as described below, and the propylene copolymer (Ib) thus produced was transferred to downstream stages without deactivation and an ethylene-α-olefin copolymer (II-1b), and an ethylene-α-olefin copolymer (II-2b) were prepared by a polymerization step III-1 as described below and a polymerization step III-2 as described below.

[Polymerization Step I (Propylene-Ethylene Copolymerization Using an Olefin Prepolymerization Reactor)]

By using the slurry polymerization reactor of a vessel type, made of SUS304 and equipped with a stirrer, copolymerization of propylene and ethylene was carried out. That is, the polymerization reaction was carried out with propylene, ethylene, hydrogen, triethylaluminum, tert-butyl-n-propyldimethoxysilane, and the slurry of the prepolymerization catalyst component thus produced in (1-1a) continuously supplied into the reactor. Reaction conditions thereof were as below.

Polymerization Temperature: 50° C.
Stirring Speed: 150 rpm
Liquid Level in the Reactor: 26 L
Supplying Amount of Propylene: 20 kg/hour
Supplying Amount of Ethylene: 0.03 kg/hour
Supplying Amount of Hydrogen: 40.0 NL/hour
Supplying Amount of Triethylaluminum: 19.6 mmol/hour
Supplying Amount of tert-butyl-n-propyldimethoxysilane: 3.09 mmol/hour
Supplying Amount of the slurry of the prepolymerization catalyst component (based on the polymerization catalyst component): 0.23 g/hour
Polymerization Pressure: 3.20 MPa (gauge pressure)

[Polymerization Step II (Propylene-Ethylene Copolymerization (Vapor Polymerization) Using Multi-Stage Vapor Polymerization Reactor)]

As the multi-stage vapor polymerization reactor, a multi-stage vapor polymerization reactor with 6 stages of reaction regions connected in the vertical direction, an uppermost one of which was a fluidized bed, and remaining 5 of which were spouted beds was provided.

From the slurry polymerization reactor of the preceding stage, the slurry containing the polypropylene particles and the liquid propylene was continuously supplied to the fluidized-bed type uppermost stage of the multi-staged gas phase polymerization reactor without inactivating the slurry.

The transfer of the polypropylene particles from one stage to another within the multi-staged gas-phase polymerization reactor was carried out by a double-valve method.

This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the powders are moved into a space between the on-off valves from the upstream reaction region and retained in the space, and after the upstream on-off valve is closed thereafter, the downstream on-off valve is opened, so that the polypropylene particles are moved into the downstream reaction region.

From a lower part of the multi-staged gas phase polymerization reactor configured as above, propylene, ethylene, and hydrogen were continuously supplied.

While, with this configuration, the fluidized bed and the spouted beds were formed in the corresponding reaction regions, and the supplying rates of propylene, ethylene, and hydrogen were controlled in such a way as to maintain gas composition and pressure constant, and propylene-ethylene copolymerization was further carried out while purging excess gas. Reaction conditions thereof were as below.

Polymerization temperature: 60° C.
Polymerization pressure: 1.40 MPa (Gauge pressure)

In the reactor, concentration ratios of in-reactor gases were such that ethylene/(hydrogen+propylene+ethylene) was 4.1 mol %, and hydrogen/(hydrogen+propylene+ethylene) was 13.9 mol %.

[Polymerization Step III-1 (Propylene-Ethylene Copolymerization (Vapor Polymerization) Using Fluidized Bed-Type Reactor)]

The polypropylene particles discharged from the multi-stage vapor phase polymerization reactor of the preceding stage were continuously supplied to a fluidized bed-type reactor serving as the fluidized bed-type olefin polymerization reactor.

The fluidized bed-type reactor of the polymerization step III-1 had one stage of fluidized-bed reaction region in the vertical direction, and transfer means for transferring the polypropylene particles from the multi-stage vapor phase polymerization reactor of the preceding stage to the fluidized bed-type reactor was carried out by the double-valve method described above.

While continuously supplying propylene, ethylene, and hydrogen into the fluidized bed-type reactor configured as above, and maintaining gas composition and pressure constant by controlling the supplying rates of the gases and by purging excess gas, copolymerization of propylene and ethylene was carried out in the presence of polypropylene particles. Reaction conditions thereof were as below.

Polymerization temperature: 70° C.
Polymerization pressure: 1.37 MPa (Gauge pressure)

In the reactor, concentration ratios of in-reactor gases were such that ethylene/(hydrogen+propylene+ethylene) was 20.6 mol %, and hydrogen/(hydrogen+propylene+ethylene) was 2.37 mol %.

[Polymerization Step III-2 (Propylene-Ethylene Copolymerization (Vapor Polymerization) Using Fluidized Bed-Type Reactor)]

The polypropylene particles discharged from the fluidized bed-type reactor of the polymerization step III-1 were continuously supplied to a fluidized bed-type reactor of a further following stage.

The fluidized bed-type reactor of the polymerization step III-2 had one stage of fluidized-bed reaction region in the vertical direction, and transfer means for transferring the polypropylene particles from the fluidized bed-type reactor of the polymerization step III-1 to the fluidized bed-type reactor of the polymerization step III-2 was carried out by the double-valve method.

The copolymerization of propylene and ethylene was carried out in a similar manner to that in Polymerization Step III-1 except the following conditions, thereby obtaining a heterophasic propylene polymerization material (A-2).

Polymerization temperature: 70° C.
Polymerization pressure: 1.33 MPa (Gauge pressure)

In the reactor, concentration ratios of in-reactor gases were such that ethylene/(hydrogen+propylene+ethylene) was 21.1 mol %, and hydrogen/(hydrogen+propylene+ethylene) was 0.08 mol %.

The composition of the heterophasic propylene polymerization material (A-2)
Content of Propylene Copolymer (Ia): 53.5 wt %
Content of Ethylene-Propylene Copolymer (II-1b): 36.2 wt %
Content of Ethylene-Propylene Copolymer (II-2b): 10.3 wt %
Contents of Monomer unit derived from Ethylene
Content of the monomer in the Propylene Copolymer (Ib): 5.4 wt %
Content of the monomer in Ethylene-Propylene Copolymer (II-1b): 19.8 wt %
Content of the monomer in Ethylene-Propylene Copolymer (II-2b): 19.9 wt %
Limiting Viscosities
Propylene Copolymer (Ib): 0.9 dL/g
Ethylene-Propylene Copolymer (II-1b): 2.2 dL/g
Ethylene-Propylene Copolymer (II-2b): 7.8 dL/g
Limiting Viscosity of CXS Component/Limiting viscosity of CXIS Component: 1.8
Molecular Weight Distribution (Mw/Mn) of CXS component in Heterophasic Propylene Polymerization Material (A-2): 64.2

$$Y \leq 4.37X - 32.4 \quad (3)$$

X=19.8
Right side of Equation (3)=4.37×19.8−32.4=54.1
Y=46.5

Example 5

After 100 parts by weight of the heterophasic propylene polymerization material (A-2) thus obtained in Example 4, 0.05 parts by weight of calcium stearate (made by NOF CORPORATION), 0.1 parts by weight of octadecyl-3-(3,5-di-tert-butyl-4-hydroxyphenyl)propionate, 0.1 parts by weight of 6-[3-(3-tert-butyl-4-hydroxy-5-methylphenyl)propoxy]-2,4,8,10-tetra-tert-butyldibenzo[d,f][1.3.2]dioxaphosphepin (SUMILIZER GP, made by Sumitomo Chemical Company, Limited) were mixed, a mixture thus obtained was melted, mixed and kneaded by using a single-screw extruder (made by TANABE PLASTICS MACHINERY CO., LTD., barrel internal diameter: 40 mm, screw speed: 100 rpm, and cylinder temperature: 200° C.), thereby obtaining a melted, mixed and kneaded product, which was then extruded from a die part. An extrusion product thus obtained was cooled to solidify with cool water, and cut, thereby obtaining pellets of a resin composition (B-3).

Melt flow rate of the resin composition (B-3): 5.4 g/10 min

A mixture of 100 parts by weight of the resin composition (B-3) and 10 parts by weight of black master batch containing carbon black was mixed and molded by the method described in (6-1-1), thereby obtaining a molded article for the outer appearance evaluation (1). The molded article for the outer appearance evaluation (1) was evaluated by the method described in (6-2-1), finding that an outer appearance index thereof was 71.

A mixture of 100 parts by weight of the resin composition (B-3) and 10 parts by weight of black master batch containing carbon black was mixed and molded by the method described in (6-1-2), thereby obtaining a molded article for the outer appearance evaluation (2). The molded article for the outer appearance evaluation (2) was evaluated by the method described in (6-2-2). The observation found no changes in the outer appearance of the mirror finish of molded article before and after holding the molded article for the outer appearance evaluation (2) at 23° C. in relative humidity of 50% for 120 hours.

A mixture of 100 parts by weight of the resin composition (B-3) and 10 parts by weight of black master batch containing carbon black was mixed and molded by the method described in (7-1), thereby obtaining a molded article for Izod impact strength measurement. Evaluation by the method described in (7-2) above found that the Izod impact strength of the molded article for Izod impact strength measurement was 9.2 kJ/m$^2$.

Comparative Example 1

(A-3) Heterophasic Propylene Polymerization Material
(A-3a) Prepolymerization
Into an SUS-made autoclave with an internal volume of 3 L equipped with a stirrer, 1.3 L of n-hexane, 26 mmol of triethylaluminum, and 2.6 mmol of tert-butyl-n-propyldimethoxysilane, which were sufficiently dehydrated and deaerated, were added.

After 7 g of the solid catalyst component prepared similarly as Example 1 was added therein, 7 g of propylene was added over 30 min continuously with the temperature of the autoclave kept at about 10° C. In this way, the prepolymerization was carried out. After that, a prepolymerization slurry thus obtained was transferred into an SUS316L-made autoclave with an internal volume of 260 L equipped with a stirrer, and 184 L of liquid butane was added therein, thereby preparing a slurry of a prepolymerization catalyst component.

(A-3b) Main Polymerization
In a device provided with a slurry polymerization reactor and three vapor phase reactors connected in tandem, a propylene polymer component (Ic) was prepared by a polymerization step I as described below and a polymerization step II as described below, and the propylene polymer component (Ic) thus produced was transferred to downstream stages without deactivation and an ethylene-α-olefin copolymer (II-1c) was prepared by a polymerization step III-1 as described below and a polymerization step III-2 as described below.

[Polymerization Step I (Propylene Polymerization Using an Olefin Prepolymerization Reactor)]

By using the slurry polymerization reactor of a vessel type, made of SUS304 and equipped with a stirrer, polymerization of propylene was carried out. That is, the polymerization reaction was carried out with propylene, hydrogen, triethylaluminum, tert-butyl-n-propyldimethoxysilane, and the slurry of the prepolymerization catalyst component thus produced in (A-3a) continuously supplied into the reactor. Reaction conditions thereof were as below.

Polymerization Temperature: 50° C.
Stirring Speed: 150 rpm
Liquid Level in the Reactor: 18 L
Supplying Amount of Propylene: 25 kg/hour
Supplying Amount of Hydrogen: 77.5 NL/hour
Supplying Amount of Triethylaluminum: 28.8 mmol/hour
Supplying Amount of tert-butyl-n-propyldimethoxysilane: 5.13 mmol/hour
Supplying Amount of the slurry of the prepolymerization catalyst component (based on the polymerization catalyst component): 0.24 g/hour
Polymerization Pressure: 3.37 MPa (gauge pressure)

[Polymerization Step II (Propylene Polymerization (Vapor Polymerization) Using Multi-Stage Vapor Polymerization Reactor)]

As the multi-stage vapor polymerization reactor, a multi-stage vapor polymerization reactor with 6 stages of reaction regions connected in the vertical direction, an uppermost one of which was a fluidized bed, and remaining 5 of which were spouted beds was provided.

From the slurry polymerization reactor of the preceding stage, the slurry containing the polypropylene particles and the liquid propylene was continuously supplied to the fluidized-bed type uppermost stage of the multi-staged gas phase polymerization reactor without inactivating the slurry.

The transfer of the polypropylene particles from one stage to another within the multi-staged gas-phase polymerization reactor was carried out by a double-valve method.

This transfer scheme is configured such that an upstream reaction region and a downstream reaction region are connected with each other via a one inch-sized pipe provided with two on-off valves, and an upstream one of the on-off valves is opened while a downstream one of the on-off valves is closed, so that the powders are moved into a space between the on-off valves from the upstream reaction region and retained in the space, and after the upstream on-off valve is closed thereafter, the downstream on-off valve is opened, so that the polypropylene particles are moved into the downstream reaction region.

From a lower part of the multi-staged gas phase polymerization reactor configured as above, propylene and hydrogen were continuously supplied.

While, with this configuration, the fluidized bed and the spouted beds were formed in the corresponding reaction regions, and the supplying rates of propylene and hydrogen were controlled in such a way as to maintain gas composition and pressure constant, and propylene polymerization was further carried out while purging excess gas. Reaction conditions thereof were as below.

Polymerization Temperature: 70° C.
Polymerization pressure: 2.00 MPa (gauge pressure)
In this reactor, a gas concentration ratio of in-reactor gases was such that (hydrogen/(hydrogen+propylene)) was 12.0 mol %.

[Polymerization Step III-1 (Propylene-Ethylene Copolymerization (Vapor Polymerization) Using Fluidized Bed-Type Reactor)]

The polypropylene particles discharged from the multi-stage vapor phase polymerization reactor of the preceding stage were continuously supplied to a fluidized bed-type reactor serving as the fluidized bed-type olefin polymerization reactor. The fluidized bed-type reactor of the polymerization step III-1 had one stage of fluidized-bed reaction region in the vertical direction, and transfer means for transferring the polypropylene particles from the multi-stage vapor phase polymerization reactor of the preceding stage to the fluidized bed-type reactor was carried out by the double-valve method described above.

While continuously supplying propylene, ethylene, and hydrogen into the fluidized bed-type reactor configured as above, and maintaining gas composition and pressure constant by controlling the supplying rates of the gases and by purging excess gas, copolymerization of propylene and ethylene was carried out in the presence of polypropylene particles. Reaction conditions thereof were as below.

Polymerization Temperature: 70° C.
Polymerization pressure: 1.96 MPa (gauge pressure)
In the reactor, a concentration ratios of in-reactor gases were such that ethylene/(hydrogen+propylene+ethylene) was 17.6 mol % and
hydrogen/(hydrogen+propylene+ethylene) was 3.02 mol %.

[Polymerization Step III-2 (Propylene-Ethylene Copolymerization (Vapor Polymerization) Using Fluidized Bed-Type Reactor)]

The polypropylene particles discharged from the fluidized bed-type reactor of the polymerization step III-1 were continuously supplied to a fluidized bed-type reactor of a further following stage.

The fluidized bed-type reactor of the polymerization step III-2 had one stage of fluidized-bed reaction region in the vertical direction, and transfer means for transferring the polypropylene particles from the fluidized bed-type reactor of the polymerization step III-1 to the fluidized bed-type reactor of the polymerization step III-2 was carried out by the double-valve method.

The copolymerization of propylene and ethylene was carried out in a similar manner to that in Polymerization Step III-1 except the following conditions, thereby obtaining a heterophasic propylene polymerization material (A-3).

Polymerization temperature: 70° C.
Polymerization pressure: 1.92 MPa (Gauge pressure)
In the reactor, concentration ratios of in-reactor gases were such that ethylene/(hydrogen+propylene+ethylene) was 17.5 mol %, and hydrogen/(hydrogen+propylene+ethylene) was 3.07 mol %.

The composition of the heterophasic propylene polymerization material (A-3)
Content of Propylene Homopolymer (Ic): 59.5 wt %
Content of Ethylene-Propylene Copolymer (II-1c): 40.5 wt %
Contents of Monomer unit derived from Ethylene
Content of the monomer in the Propylene Homopolymer (Ic): 0 wt %
Content of the monomer in Ethylene-Propylene Copolymer (II-1c): 20.5 wt %
Limiting Viscosities
Propylene Homopolymer (Ic): 0.9 dL/g
Ethylene-Propylene Copolymer (II-1c): 2.1 dL/g $$Y \leq 4.37X - 32.4 \quad (3)$$

X=20.5
Right side of Equation (3)=4.37×20.5−32.4=57.2
Y=40.5

Comparative Example 2

After 100 parts by weight of the heterophasic propylene polymerization material (A-3) thus obtained in Comparative Example 1, 0.05 parts by weight of calcium stearate (made by NOF CORPORATION), 0.1 parts by weight of octadecyl-3-(3,5-di-tert-butyl-4-hydroxyphenyl)propionate, 0.1 parts by weight of 6-[3-(3-tert-butyl-4-hydroxy-5-methylphenyl)propoxy]-2,4,8,10-tetra-tert-butyldibenzo[d,f][1.3.2]dioxaphosphepin (SUMILIZER GP, made by Sumitomo Chemical Company, Limited) were mixed, a mixture thus obtained was melted, mixed and kneaded by using a single-screw extruder (made by TANABE PLASTICS MACHINERY CO., LTD., barrel internal diameter: 40 mm, screw speed: 100 rpm, and cylinder temperature: 200° C.), thereby obtaining a melted, mixed and kneaded product, which was then extruded from a die part. An extrusion product thus obtained was cooled to solidify with cool water, and cut, thereby obtaining pellets of a resin composition (B-3).

Melt flow rate of the resin composition (B-3): 16 g/10 min
A mixture of 100 parts by weight of the resin composition (B-3) and 10 parts by weight of black master batch containing carbon black was mixed and molded by the method described in (6-1-1), thereby obtaining a molded article for the outer appearance evaluation (1). The molded article for the outer appearance evaluation (1) was evaluated by the method described in (6-2-1), finding that an outer appearance index thereof was 68.

A mixture of 100 parts by weight of the resin composition (B-5) and 10 parts by weight of black master batch containing carbon black was mixed and molded by the method described in (6-1-2), thereby obtaining a molded article for the outer appearance evaluation (2). The molded article for the outer appearance evaluation (2) was evaluated by the method described in (6-2-2). The observation found whitening in the outer appearance of the mirror finish of molded article after holding the molded article for the outer appearance evaluation (2) at 23° C. in relative humidity of 50% for 120 hours.

A mixture of 100 parts by weight of the resin composition (B-5) and 10 parts by weight of black master batch containing carbon black was mixed and molded by the method described in (7-1), thereby obtaining a molded article for Izod impact strength measurement. Evaluation by the method described in (7-2) above found that the Izod impact strength of the molded article for Izod impact strength measurement was 10.9 kJ/m².

TABLE 1

|  | Example 1 | Example 4 |
|---|---|---|
| Heterophasic Propylene polymerization material | A-1 | A-2 |
| Propylene copolymer (I) | | |
| Content (wt %) | 57.1 | 53.5 |
| Content of ethylene (wt %) | 5.8 | 5.4 |
| Limiting Viscosity $[\eta]_I$ (dl/g) | 0.9 | 0.9 |
| Ethylene-Propylene Copolymer (II-1) | | |
| Content $a_1$ (wt %) | 28.1 | 36.2 |
| Content of ethylene $b_1$ (wt %) | 21.9 | 19.8 |
| Limiting Viscosities (dl/g) | 2.4 | 2.2 |
| Ethylene-Propylene Copolymer (II-2) | | |
| Content $a_2$ (wt %) | 14.8 | 10.3 |
| Content of ethylene $b_2$ (wt %) | 19.9 | 19.9 |
| Limiting Viscosities (dl/g) | 7.3 | 7.8 |
| $[\eta]_{CXS}/[\eta]_{CXIS}$ | 1.9 | 1.8 |
| $X = (a_1b_1 + a_2b_2)/(a_1 + a_2)$ | 21.2 | 19.8 |
| $Y = a_1 + a_2$ | 42.9 | 46.5 |
| Right side of Equation (3) = 4.37X − 32.4 | 60.2 | 54.1 |

INDUSTRIAL APPLICABILITY

The heterophasic propylene polymerization material according to the present invention is applicable, for example, as raw materials for automobile parts such as interior parts and exterior parts of automobiles, food and medical containers, parts of furniture and electric products, and civil engineering and building materials, and the like.

The invention claimed is:

1. A heterophasic propylene polymerization material, comprising:
   a propylene copolymer (I); an ethylene-α-olefin copolymer (II-1); and an ethylene-α-olefin copolymer (II-2), wherein a limiting viscosity $[\eta]_I$ of the propylene copolymer (I) is less than 1.50 dL/g, and wherein
   the propylene copolymer (I) is a copolymer comprising a monomer unit derived from propylene and a monomer unit derived from at least one olefin selected from the group consisting of ethylene and $C_4$ to $C_{12}$ α-olefins,
   wherein a content of the monomer unit derived from at least one olefin selected from the group consisting of ethylene and $C_4$ to $C_{12}$ α-olefins is not less than 0.05 wt % but less than 10 wt %, with respect to 100 wt % of a total weight of the propylene copolymer (I),
   wherein the ethylene-α-olefin copolymer (II-1) is a copolymer comprising a monomer unit derived from ethylene, and a monomer unit derived from at least one olefin selected from the group consisting of propylene and $C_4$ to $C_{12}$ α-olefins,
   wherein a content of the monomer unit derived from ethylene is not less than 10 wt % but not more than 30 wt % with respect to 100 wt % of a total weight of the ethylene-α-olefin copolymer (II-1),
   wherein the ethylene-α-olefin copolymer (II-2) is a copolymer comprising a monomer unit derived from ethylene, and a monomer unit derived from at least one olefin selected from the group consisting of propylene and $C_4$ to $C_{12}$ α-olefins,
   wherein a content of the monomer unit derived from ethylene is not less than 10 wt % but not more than 30 wt % with respect to 100 wt % of a total weight of the ethylene-α-olefin copolymer (II-2), and wherein the ethylene-α-olefin copolymer (II-2) has a limiting viscosity greater than a limiting viscosity of the ethylene-α-olefin copolymer (II-1), and
   wherein a ratio $[\eta]_{CXS}/[\eta]_{CXIS}$ is 1.0 or greater, where $[\eta]_{CXS}$ is a limiting viscosity of a xylene soluble component of the heterophasic propylene polymerization material and $[\eta]_{CXIS}$ is a limiting viscosity of a xylene insoluble component of the heterophasic propylene polymerization material.

2. The heterophasic propylene polymerization material according to claim 1, wherein $$X=(a_1b_1+a_2b_2)/(a_1+a_2) \quad (1),$$

$$Y=a_1+a_2 \quad (2), \text{ and}$$

$$Y \leq 4.37X-32.4 \quad (3),$$

where $a_1$ is the content (wt %) of the ethylene-α-olefin copolymer (II-1), and $a_2$ is the content (wt %) of the ethylene-α-olefin copolymer (II-2) (where the total weight of the heterophasic propylene polymerization material is 100 wt %),
$b_1$ is the content (wt %) of the monomer unit derived from ethylene in the ethylene-α-olefin copolymer (II-1) (where the total weight of the ethylene-α-olefin copolymer (II-1) is 100 wt %), and
$b_2$ is the content (wt %) of the monomer unit derived from ethylene in the ethylene-α-olefin copolymer (II-2) (where the total weight of the ethylene-α-olefin copolymer (II-2) is 100 wt %).

3. A propylene resin composition comprising the heterophasic propylene polymerization material according to claim 1 and a thermoplastic elastomer (III).

4. The propylene resin composition according to claim 3, further comprising a filler (D).

5. A propylene resin composition comprising the heterophasic propylene polymerization material according to claim 1 and a filler (D).

6. A molded article comprising the heterophasic propylene polymerization material according to claim claim 1.

7. A molded article comprising the propylene resin composition according to claim 3.

8. A production method of the heterophasic propylene polymerization material according to claim 1 comprising:
   a Step (1-1) of performing a multi-stage polymerization method in the presence of a propylene polymerization catalyst to copolymerize propylene and at least one olefin selected from the group consisting of ethylene and $C_4$ to $C_{12}$ α-olefins to obtain the propylene copolymer (I);

a Step (1-2-1) of copolymerizing, in the presence of the propylene copolymer (I), ethylene and at least one olefin selected from the group consisting of propylene and $C_4$ to $C_{12}$ α-olefins to obtain a mixture of the propylene copolymer (I) and the ethylene-α-olefin copolymer (II-1); and a Step (1-2-2) of copolymerizing, in the presence of the mixture, ethylene and at least one olefin selected from the group consisting of propylene and $C_4$ to $C_{12}$ α-olefins, to obtain the heterophasic propylene polymerization material comprising the propylene copolymer (I), the ethylene-α-olefin copolymer (II-1), and the ethylene-α-olefin copolymer (II-2).

\* \* \* \* \*